US011840288B2

(12) United States Patent
Watanabe et al.

(10) Patent No.: US 11,840,288 B2
(45) Date of Patent: Dec. 12, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 514 days.

(21) Appl. No.: 16/947,994

(22) Filed: Aug. 27, 2020

(65) Prior Publication Data
US 2021/0094631 A1 Apr. 1, 2021

(30) Foreign Application Priority Data
Sep. 30, 2019 (JP) .................................. 2019-178526

(51) Int. Cl.
*B62D 37/02* (2006.01)
*F15D 1/10* (2006.01)
*B62D 25/18* (2006.01)
*B60R 16/033* (2006.01)
*B60C 13/00* (2006.01)
*B60B 21/12* (2006.01)

(52) U.S. Cl.
CPC ............ *B62D 37/02* (2013.01); *B60R 16/033* (2013.01); *B62D 25/18* (2013.01); *F15D 1/10* (2013.01); *B60B 21/12* (2013.01); *B60C 13/00* (2013.01)

(58) Field of Classification Search
CPC ........ B62D 37/02; B62D 35/00; B62D 25/18; B60R 16/033; B60C 13/00; B60C 19/00; B60B 7/0086; B60B 7/01; B60B 2900/1216; B60B 2900/513; F15D 1/10; F15D 1/0075; Y02T 10/88; Y02T 10/82
See application file for complete search history.

(56) References Cited

U.S. PATENT DOCUMENTS

| 4,772,299 A | * | 9/1988 | Bogusz | .................. F16D 65/78 296/180.1 |
| 5,090,766 A | * | 2/1992 | Ito | ........................ B62D 37/02 296/180.5 |

(Continued)

FOREIGN PATENT DOCUMENTS

| DE | 102009006242 A1 | * | 7/2010 | ............. B62D 35/00 |
| EP | 3064416 B1 | * | 9/2018 | ............. B60R 16/06 |

(Continued)

OTHER PUBLICATIONS

Notice of Reasons for Refusal issued in Japanese Patent Application No. 2019-178526 dated Jun. 6, 2023, with machine translation.

*Primary Examiner* — Steve Clemmons
(74) *Attorney, Agent, or Firm* — TROUTMAN PEPPER HAMILTON SANDERS LLP

(57) ABSTRACT

An airflow adjusting apparatus to be installed in a vehicle includes an airflow generator and a controller. The airflow generator is provided on an inner surface of a wheel house or on a wheel. The wheel house provides a wheel containing section of a vehicle body. The wheel is contained in the wheel containing section. The airflow generator is configured to generate an airflow that flows from the wheel containing section toward outer side in a vehicle widthwise direction. The controller is configured to control the airflow generator.

13 Claims, 15 Drawing Sheets

(56) References Cited

U.S. PATENT DOCUMENTS

| | | | | |
|---|---|---|---|---|
| 6,068,328 | A * | 5/2000 | Gazdzinski | B64C 21/06 296/180.1 |
| 7,887,119 | B2 * | 2/2011 | Ramsay | B62D 35/02 296/180.1 |
| 8,167,098 | B2 * | 5/2012 | Jessberger | B60T 5/00 188/264 R |
| 8,641,127 | B2 * | 2/2014 | Ramsay | B62D 37/02 296/180.1 |
| 8,798,868 | B2 * | 8/2014 | Mares | B60T 8/1755 296/180.1 |
| 9,821,862 | B2 * | 11/2017 | Han | B62D 35/00 |
| 9,951,800 | B2 * | 4/2018 | Segawa | B60L 5/20 |
| 10,011,344 | B1 * | 7/2018 | Santavicca, Jr. | B64C 1/38 |
| 10,071,595 | B2 * | 9/2018 | Hasegawa | B60T 5/00 |
| 10,337,539 | B1 * | 7/2019 | Shah | B62D 35/00 |
| 10,495,121 | B2 * | 12/2019 | Smullin | B64C 23/005 |
| 10,512,150 | B2 * | 12/2019 | Dadheech | B62D 35/00 |
| 10,821,776 | B1 * | 11/2020 | Labadie | B60T 5/00 |
| 10,822,042 | B2 * | 11/2020 | Khalighi | B62D 37/02 |
| 2007/0257512 | A1 * | 11/2007 | Anderson | B62D 35/00 296/180.1 |
| 2010/0038001 | A1 | 2/2010 | Yamaguchi | |
| 2011/0130926 | A1 * | 6/2011 | Lu | B60T 8/171 701/1 |
| 2011/0148143 | A1 * | 6/2011 | Ondracek | B62D 37/02 296/180.5 |
| 2014/0339887 | A1 | 11/2014 | Chen | |
| 2016/0016617 | A1 * | 1/2016 | Wolf | B60K 11/04 296/208 |
| 2016/0176450 | A1 * | 6/2016 | Wolf | B62D 35/00 180/68.2 |
| 2016/0272258 | A1 * | 9/2016 | Gibson | B62D 37/02 |
| 2017/0082092 | A1 * | 3/2017 | Gaither | F16D 65/847 |
| 2019/0316613 | A1 * | 10/2019 | Khalighi | F15D 1/0075 |
| 2021/0179036 | A1 * | 6/2021 | Dinh | B60T 5/00 |

FOREIGN PATENT DOCUMENTS

| | | |
|---|---|---|
| JP | 2007-253929 A | 10/2007 |
| JP | 2009-143255 A | 7/2009 |
| JP | 2014-227168 A | 12/2014 |
| JP | 2015-9749 A | 1/2015 |
| JP | 2015-44538 A | 3/2015 |
| JP | 2016-222152 A | 12/2016 |
| JP | 2017-178169 A | 10/2017 |
| JP | 2019111966 A | 7/2019 |
| WO | 2008/114668 A1 | 9/2008 |

* cited by examiner

AIRFLOW ADJUSTING APPARATUS

CROSS REFERENCE TO RELATED APPLICATIONS

The present application claims priority from Japanese Patent Application No. 2019-178526 filed on Sep. 30, 2019, the entire contents of which are hereby incorporated by reference.

BACKGROUND

The technology relates to an airflow adjusting apparatus that adjusts an airflow generated around a wheel of a traveling vehicle.

Traveling wind may be generated against a vehicle such as an automobile while the vehicle is traveling. Such traveling wind can cause air resistance or drag on the vehicle. The traveling wind can cause a turbulent flow accompanied by a vortex flow around a vehicle body, thereby increasing the air resistance and deteriorating aerodynamic noise (i.e., so-called wind noise) and aerodynamic vibration. It is easier for turbulence of an airflow to occur particularly around a wheel and in a wheel house that contains the wheel. Japanese Unexamined Patent Application Publication No. 2007-253929 discloses an aerodynamic stabilizer configured to be movable between: an airflow adjustment position at which the aerodynamic stabilizer protrudes toward an inside of a wheel house; and an avoidance position at which the aerodynamic stabilizer is able to avoid interference with a wheel. Japanese Unexamined Patent Application Publication No. 2015-009749 discloses a fin configured to reduce air blowing from a wheel house. Japanese Unexamined Patent Application Publication No. 2014-227168 discloses two or more wheel blades that are provided on a side surface of a body of a wheel, and each include an airflow guiding section and an airflow assisting section. The airflow guiding section and the airflow assisting section are respectively arranged on front side and rear side relative to each other. International Publication WO2008/114668 discloses a turbulent-flow generating projection that protrudes from a tire side surface of a wheel and that extends along a radius direction of the wheel.

SUMMARY

An aspect of the technology provides an airflow adjusting apparatus to be installed in a vehicle that includes an airflow generator and a controller. The airflow generator is provided on an inner surface of a wheel house or on a wheel. The wheel house provides a wheel containing section of a vehicle body. The wheel is contained in the wheel containing section. The airflow generator is configured to generate an airflow that flows from the wheel containing section toward outer side in a vehicle widthwise direction. The controller is configured to control the airflow generator.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

First Example Embodiment

Figure 1:
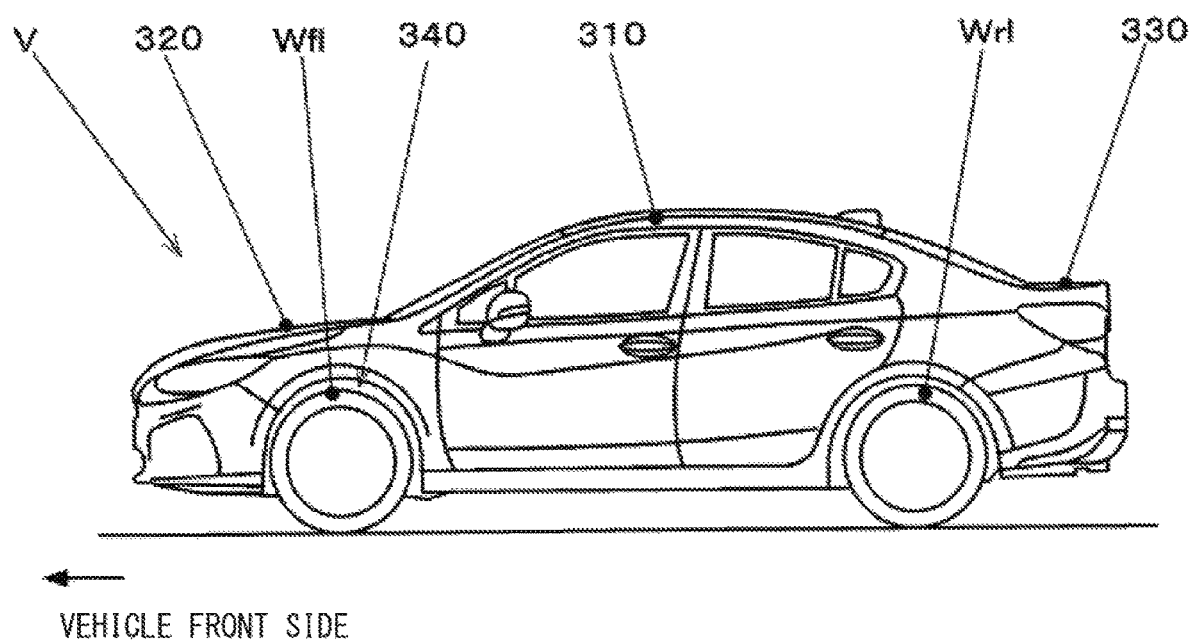
FIG. 1 is a lateral side view of an example of a vehicle including an airflow adjusting apparatus according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

An airflow adjusting apparatus according to a first example embodiment of the technology is described below.

The airflow adjusting apparatus according to the first example embodiment may include, for example but not limited to, plasma actuators and a control device. The plasma actuators may be provided on a wheel house and on a wheel of a vehicle such as a passenger car, for example.

FIG. 1 is a lateral side view of a vehicle V including the airflow adjusting apparatus according to the first example embodiment.

In one non-limiting example, the vehicle V may be a three-box passenger car including a cabin 310, an engine compartment 320, and a luggage space 330. The engine compartment 320 may be provided on front side of the cabin 310. The luggage space 330 may be provided on rear side of the cabin 310.

Provided on each of a left-lateral-side portion of the engine compartment 320, a right-lateral-side portion of the engine compartment 320, a left-lateral-side portion of a rear portion of the cabin 310, and a right-lateral-side portion of the rear portion of the cabin 310 may be a wheelhouse 340. The wheel houses 340 may contain respective wheels W.

Hereinafter, the wheels W are described and illustrated in the drawings also with additional symbols, as a right-front wheel Wfr, a left-front wheel Wfl, a right-rear wheel Wrr, and a left-rear wheel Wrl in some cases.

Figure 2:
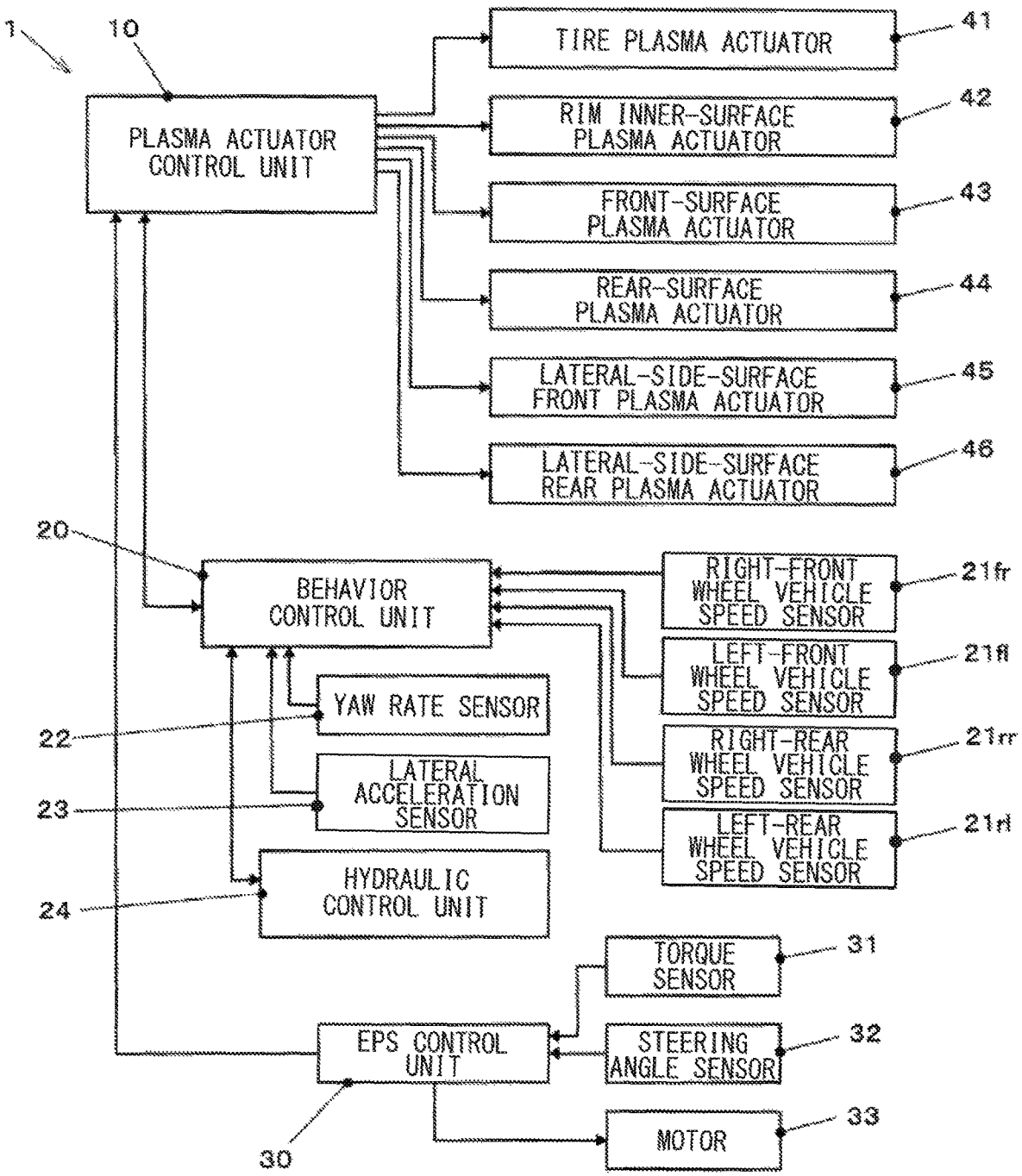
FIG. 2 is a block diagram schematically illustrating an example of a configuration of the airflow adjusting apparatus.

FIG. 2 is a block diagram schematically illustrating a configuration of the airflow adjusting apparatus (an airflow adjusting apparatus 1) according to the first example embodiment.

The airflow adjusting apparatus 1 may include, for example but not limited to, a plasma actuator control unit 10. In addition, the airflow adjusting apparatus 1 may include, for example but not limited to, a tire plasma actuator 41, a rim inner-surface plasma actuator 42, a front-surface plasma actuator 43, a rear-surface plasma actuator 44, a lateral-side-surface front plasma actuator 45, a lateral-side-surface rear plasma actuator 46 that are driven by the plasma actuator control unit 10.

Coupled to the plasma actuator control unit 10 may be a behavior control unit 20 and an electric power steering (EPS) control unit 30.

In one embodiment, the rim inner-surface plasma actuator 42, the front-surface plasma actuator 43, the rear-surface plasma actuator 44, the lateral-side-surface front plasma actuator 45, and the lateral-side-surface rear plasma actuator 46 may serve as an "airflow generator". In one embodiment, the plasma actuator control unit 10 may serve as a "controller". In one embodiment, the front-surface plasma actuator 43 and the rear-surface plasma actuator 44 may serve as a "first airflow generator". In one embodiment, the lateral-side-surface front plasma actuator 45 and the lateral-side-surface rear plasma actuator 46 may serve as a "second airflow generator". In one embodiment, the rim inner-surface plasma actuator 42 may serve as a "fourth airflow generator". In one embodiment, the lateral-side-surface front plasma actuator 45 and the lateral-side-surface rear plasma actuator 46 may also serve as a "third airflow generator".

The plasma actuator control unit 10, the behavior control unit 20, and the electric power steering control unit 30 may each include, for example but not limited to: an information processor such as a central processing unit (CPU); a storage device such as a random-access memory (RAM) or a read-only memory (ROM); an input-output interface; and a bus. The components including, without limitation, the information processor, the storage device, and the input-output interface may be coupled to each other via the bus.

The plasma actuator control unit 10, the behavior control unit 20, and the electric power steering control unit 30 may be allowed to transmit, to each other, information that may be necessary for the control. Such transmission of the information may be performed, for example but not limited to, via a controller area network (CAN) communication system, which is one type of on-vehicle local area networks (LANs).

The plasma actuator control unit 10 may control individual states of the plasma actuators provided for the respective wheels W in accordance with a traveling state of the vehicle V to thereby reduce air resistance (drag), suppress aerodynamic noise (wind noise), cool a brake, and improve driving stability (aerodynamic driving stability). Non-limiting examples of the states of each of the plasma actuators may include: activation or deactivation of the plasma actuator; an airflow direction of the plasma actuator in a case of activating the plasma actuator; and an air flow velocity in the case of activating the plasma actuator.

Specific but non-limiting examples of control to be performed by the plasma actuator control unit 10 will be described later in detail.

The plasma actuator control unit 10 may acquire information regarding transition of a brake fluid pressure from a hydraulic control unit 24 via the behavior control unit 20, and estimate a heat generation amount of a braking device B.

The behavior control unit 20 may perform control including, without limitation, behavior control, anti-lock brake control, and torque vectoring control. The behavior control may be performed in a case where behavior such as oversteer or understeer occurs in the vehicle V. The behavior control may involve generating a yaw moment in a direction of suppressing such behavior. The anti-lock brake control may involve preventing wheel lock when braking is performed by a service brake such as a foot brake. The torque vectoring control may involve generating a difference between driving force of a left driving wheel and driving force of a right driving wheel upon traveling with a driving force of a vehicle.

Coupled to the behavior control unit 20 may be, for example but not limited to, a right-front wheel vehicle speed sensor 21fr, a left-front wheel vehicle speed sensor 21fl, a right-rear wheel vehicle speed sensor 21rr, a left-rear wheel vehicle speed sensor 21rl, a yaw rate sensor 22, a lateral acceleration sensor 23, and the hydraulic control unit 24.

The right-front wheel vehicle speed sensor 21fr, the left-front wheel vehicle speed sensor 21fl, the right-rear wheel vehicle speed sensor 21rr, and the left-rear wheel vehicle speed sensor 21rl may be provided respectively on hubs to which the right-front wheel Wfr, the left-front wheel Wfl, the right-rear wheel Wrr, and the left-rear wheel Wrl are rotatably attached. The right-front wheel vehicle speed sensor 21fr, the left-front wheel vehicle speed sensor 21fl, the right-rear wheel vehicle speed sensor 21rr, and the left-rear wheel vehicle speed sensor 21rl may each generate a pulse signal in accordance with variation in an angular position around a rotation central axis of corresponding one of the wheels W.

Rotation speeds of the respective wheels W may be each calculated on the basis of a cycle of the generated pulse signal. Further, a traveling speed (i.e., a vehicle speed) of the vehicle V may be calculated on the basis of the calculated rotation speeds and a tire outer diameter that may be known in advance.

The yaw rate sensor 22 may detect a yaw rate that is an angular speed of rotation around a vertical axis of a vehicle body of the vehicle V.

The lateral acceleration sensor 23 may detect acceleration, in a vehicle widthwise direction, acting on the vehicle body of the vehicle V. Such acceleration may be, in other words, centripetal acceleration at the time of turning.

The yaw rate sensor 22 and the lateral acceleration sensor 23 may each include, for example but not limited to, a microelectromechanical system (MEMS) sensor that is formed by microfabrication on a substrate including a material such as silicon.

The hydraulic control unit 24 may control individual brake hydraulic pressures applied to respective hydraulic service brakes provided on the wheels W.

The hydraulic control unit 24 may include, for example but not limited to, an electric gear pump that applies a pressure to the brake fluid. The hydraulic control unit 24 may further include, for example but not limited to, a pressure-application control valve, a holding valve, a pressure-reduction control valve that control the hydraulic pressure applied to a wheel cylinder of each of the wheels W.

In a case where the right-front wheel vehicle speed sensor 21*fr*, the left-front wheel vehicle speed sensor 21*fl*, the right-rear wheel vehicle speed sensor 21*rr*, or the left-rear wheel vehicle speed sensor 21*rl* detects that the corresponding one of the wheels W is locked, the behavior control unit 20 may perform the anti-lock brake control to reduce a wheel cylinder hydraulic pressure of the brake of the locked wheel W and thereby recover rotation of the wheel W.

Further, the behavior control unit 20 may compare a target yaw rate with an actual yaw rate. The target yaw rate may be calculated on the basis of factors including, without limitation, a vehicle speed of the vehicle V, a front-wheel steering angle, vehicle-body lateral acceleration, and an estimated coefficient of friction on a road surface. The actual yaw rate may be detected by the yaw rate sensor 21. In a case where the actual yaw rate is excessively smaller than the target yaw rate, the behavior control unit 20 may recognize that the vehicle V is in an understeer state, and generate braking force for turning inner wheels. The behavior control unit 20 may thereby generate a yaw moment in a direction of suppressing the understeer state with use of a difference in braking-driving force between the left wheels Wfl and Wrl and the right wheels Wfr and Wrr.

In a case where the actual yaw rate is excessively larger than the target yaw rate, the behavior control unit 20 may recognize that the vehicle is in an oversteer state, and generate braking force for turning outer wheels. The behavior control unit 20 may thereby generate a yaw moment in a direction of suppressing the oversteer state with use of a difference in braking-driving force between the left wheels Wfl and Wrl and the right wheels Wfr and Wrr.

The plasma actuator control unit 10 may be configured to control the respective plasma actuators in association with generation of the difference in the braking-driving force performed by the behavior control unit 20.

Details thereof will be described later.

The electric power steering control unit 30 may control an electric power steering device. The electric power steering device may: provide steering torque to a steering system of the vehicle V by means of an electric actuator (i.e., a motor 33); perform power assist to reduce steering effort and steering holding effort exerted by a driver at the time of manual driving; and perform steering operation in accordance with each type of control at the time of, for example but not limiting to, automatic driving, lane deviation prevention control, and lane keeping assist control.

The electric power steering control unit 30 may receive outputs from a torque sensor 31 and a steering angle sensor 32, and provide a control command value to the motor 33.

The torque sensor 31 may be provided on a steering column that transmits rotation of a steering wheel to a steering gear box. The torque sensor 31 may detect torque acting on the steering column.

The steering angle sensor 32 may detect a current steering angle of the steering system on the basis of, for example but not limited to, an angular position of the steering column.

The motor 33 may be an electric actuator that provides the assist torque to the steering system. For example, the motor 33 may provide thrust to a steering rack in the steering gear box.

The tire plasma actuator 41, the rim inner-surface plasma actuator 42, the front-surface plasma actuator 43, the rear-surface plasma actuator 44, the lateral-side-surface front plasma actuator 45, and the lateral-side-surface rear plasma actuator 46 may be provided on respective portions of the vehicle V and may each serve as an airflow generator that generates an airflow F.

A two-electrode plasma actuator 100 to be described below may be used as each of the tire plasma actuator 41, the rim inner-surface plasma actuator 42, the front-surface plasma actuator 43, the rear-surface plasma actuator 44, the lateral-side-surface front plasma actuator 45, and the lateral-side-surface rear plasma actuator 46.

Figure 3:
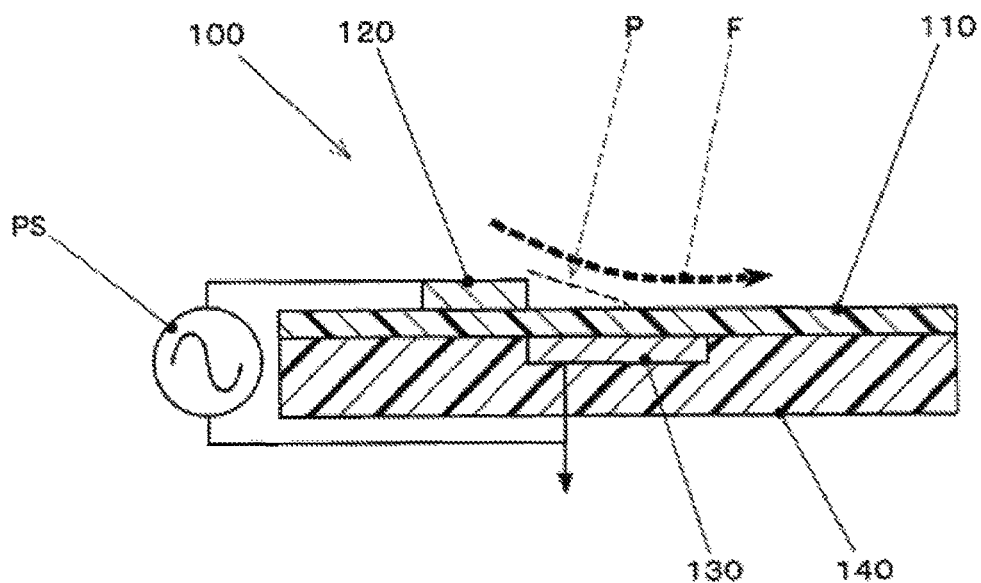
FIG. 3 is a schematic cross-sectional view of an example of a two-electrode plasma actuator to be included in the airflow adjusting apparatus.

FIG. 3 is a schematic cross-sectional view of the plasma actuator 100 taken along a plane that is parallel to a generation direction of the airflow F.

The plasma actuator 100 may be a fluid control device that induces the airflow F by means of a configuration having no movable part.

The plasma actuator 100 according to the first example embodiment may be a dielectric barrier discharge plasma actuator (DBD-PA), for example.

The plasma actuator 100 may include, for example but not limited to, a dielectric 110, an upper electrode 120, a lower electrode 130, and an insulator 140.

The dielectric 110 may be a sheet-shaped member including a material such as fluorocarbon resin, for example. Non-limiting examples of the fluorocarbon resin may include polytetrafluoroethylene.

The upper electrode 120 and the lower electrode 130 may each include an electrically-conductive tape including a metal thin film such as a copper thin film, for example.

The upper electrode 120 may be attached to an outer surface side of the dielectric 110. The outer surface side of the dielectric 110 refers to a side that is exposed to the outside when the plasma actuator 100 is attached to the wheel W.

The lower electrode 130 may be attached to an inner surface side of the dielectric 110 that is opposite to the outer surface side of the dielectric 110.

The upper electrode 120 and the lower electrode 130 may be so disposed that the upper electrode 120 and the lower electrode 130 are offset in a surface direction of the dielectric 110.

The insulator 140 may be a sheet-shaped member serving as a base of the plasma actuator 100. The insulator 140 may be so disposed on the inner surface side of the dielectric 110 as to cover the lower electrode 130.

Application, by means of a power supply PS, of an alternating-current voltage having a predetermined waveform between the upper electrode 120 and the lower electrode 130 of the plasma actuator 100 allows plasma discharge P to be generated between the upper electrode 120 and the lower electrode 130.

It may be necessary that the applied voltage be high enough to cause electrical breakdown to generate the plasma discharge P. For example, the applied voltage may be in a range from about 1 kV to about 10 kV.

Further, the applied voltage may have a frequency in a range from about 1 kHz to about 10 kHz, for example.

Upon the generation of the plasma discharge P, air on the outer surface side of the plasma actuator 100 may be drawn toward the plasma discharge P, thereby generating a wall-jet airflow F.

Further, the plasma actuator 100 may control the waveform of the applied alternating-current voltage to thereby reverse a direction of the airflow F.

The tire plasma actuator 41 may be provided on a side wall 412 of a tire 410 of the wheel W.

Figure 4:
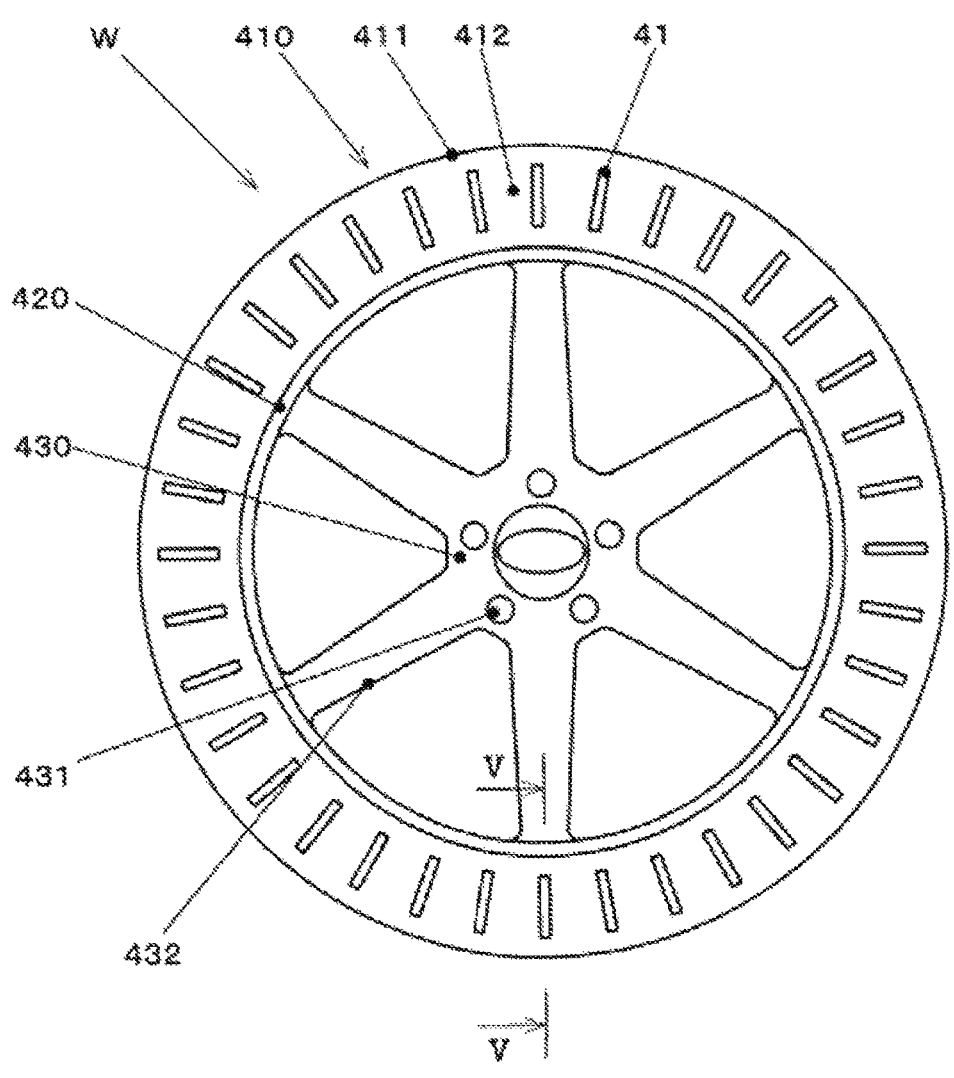
FIG. 4 is a diagram illustrating an example of a wheel of the vehicle including the airflow adjusting apparatus, viewed from a rotation central axis direction.

FIG. 4 illustrates the wheel W related to the airflow adjusting apparatus 1 according to the first example embodiment, viewed from a rotation central axis direction.

Figure 5:
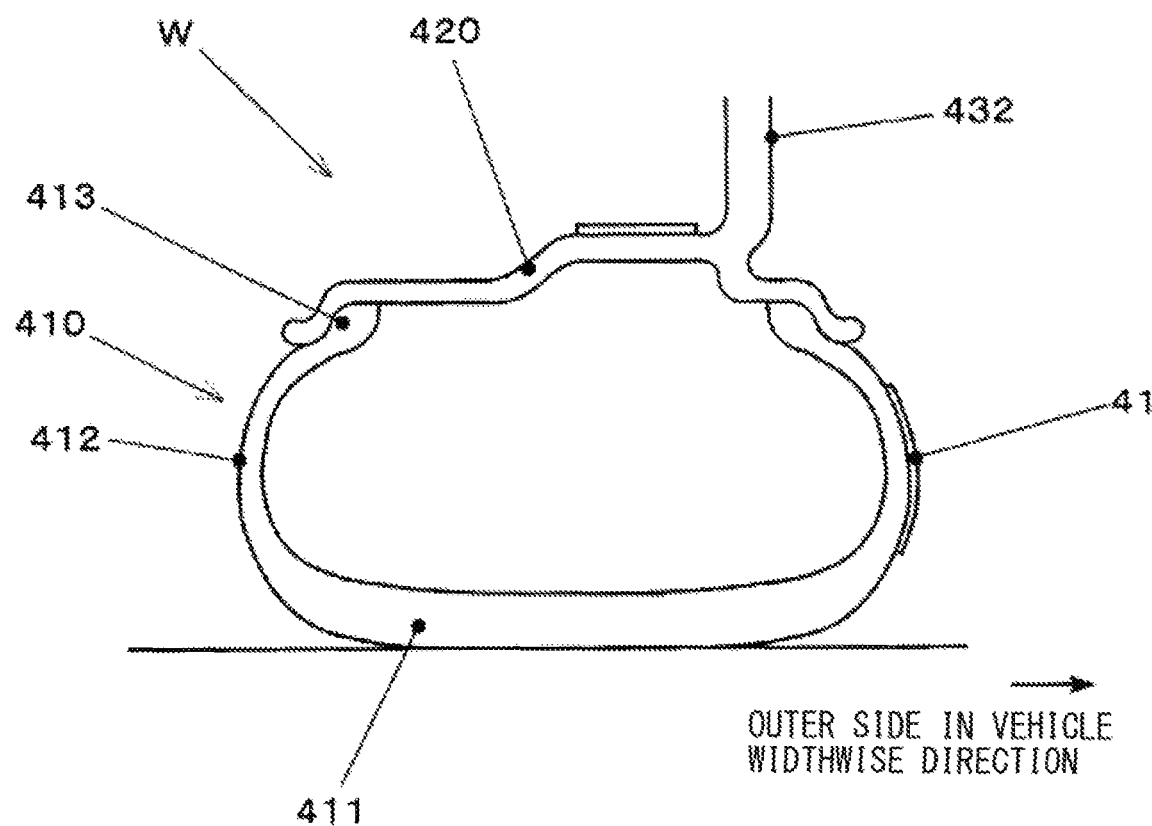
FIG. 5 is a cross-sectional view taken in a direction of arrows V-V illustrated in FIG. 4.

FIG. 5 is a cross-sectional view taken in a direction of arrows V-V illustrated in FIG. 4.

The right-front wheel Wfr, the left-front wheel Wfl, the right-rear wheel Wrr, the left-rear wheel Wrl provided on the vehicle V according to the first example embodiment may each have a configuration that is substantially similar to that of the wheel W described below.

The wheel W may include, for example but not limited to, the tire 410, a rim 420, and a disc 430.

The tire 410 may be a pneumatic rubber tire such as a steel belted radial tire, for example.

The tire 410 may include a tread 411 and the side wall 412.

The tread 411 may be a cylindrical portion that is substantially concentric with the rotation central axis of the wheel W. The tread 411 may rotate when the vehicle V travels, and may have a bottom end that comes into contact with a road surface, serving as a wheel tread portion.

The side wall 412 may be a lateral-side surface portion of the tire 410, and may protrude toward inner diameter side from both ends in an axial direction of the tread 411.

The side wall 412 may have an inner peripheral portion provided with a bead portion 413 (illustrated in FIG. 5) supported by the rim 420.

The rim 420 may be a metal member that is provided on the inner diameter side of the tire 410. The rim 420 may support the bead portion 413, and maintain an inner pressure of the tire 410 in association with the tire 410.

The disc 430 may be a disc-shaped portion provided on the inner diameter side of the rim 420. The disc 430 may have bolt holes 431 in the middle. The bolt holes 431 may each be adopted to engage the wheel W with the unillustrated huh of the vehicle V.

A region on outer diameter side of the disc 430 may include two or more spokes 432 that are radially arranged.

Gaps between the respective spokes 432 in a circumferential direction of the wheel W may serve as openings adopted to, for example but not limited to, reduce weight or cool the brake.

The rim 420 and the disc 430 may be an integrated member including a metal material such as aluminum-based alloy, for example.

The tire plasma actuator 41 may be so attached to an outer surface portion of the side wall 412 on outer side in the vehicle widthwise direction that the tire plasma actuator 41 is exposed to the outside.

Two or more tire plasma actuators 41 may be dispersedly disposed at substantially equal intervals in the circumferential direction of the wheel W. In one example, thirty-six tire plasma actuators 41 may be disposed as illustrated in FIG. 4.

The tire plasma actuator 41 may have a substantially-rectangular planar shape when viewed from the rotation central axis direction of the wheel W. The tire plasma actuator 41 may be configured to generate an airflow F in a direction (i.e., a short-side direction) perpendicular to its longitudinal direction (i.e., a long-side direction).

According to the first example embodiment, each of the tire plasma actuators 41 may have a longitudinal direction in a radial direction of the wheel W, and may generate the airflow F in a direction perpendicular to the radial direction.

The rim inner-surface plasma actuator 42 may be attached to an inner peripheral surface of the rim 420. The rim inner-surface plasma actuator 42 may be configured to generate an airflow F in the rotation central axis direction of the wheel W.

The rim inner-surface plasma actuator 42 may serve as an intra-rim airflow generator that generates the airflow F, on the inner diameter side of the rim 420, that flows toward the outer side in the vehicle widthwise direction.

The front-surface plasma actuator 43, the rear-surface plasma actuator 44, the lateral-side-surface front plasma actuator 45, and the lateral-side-surface rear plasma actuator 46 may each be provided on the inner surface of the wheel house 340.

Figure 6:
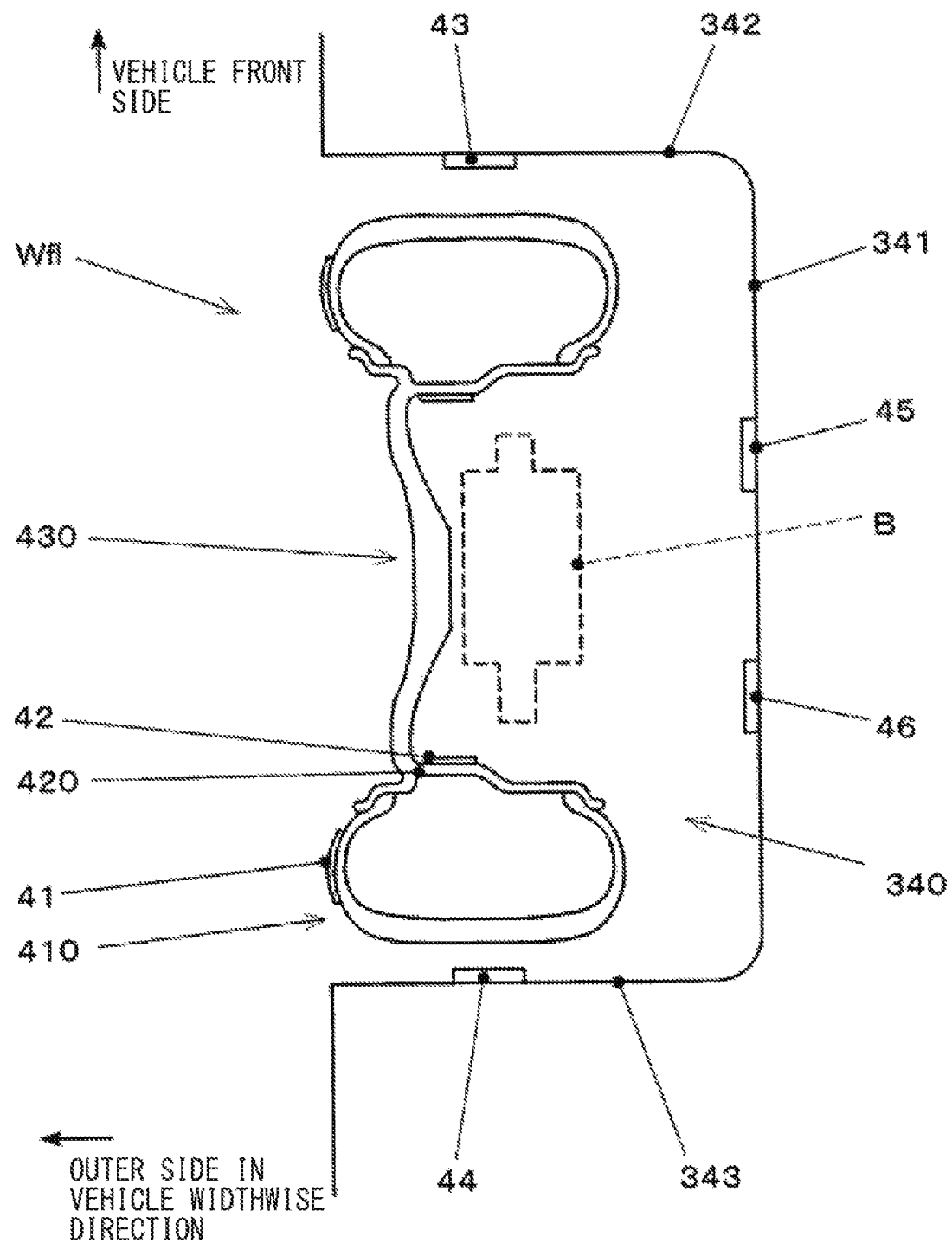
FIG. 6 is a schematic cross-sectional view of an example of an inside of a wheel house of the vehicle including the airflow adjusting apparatus according to the first example embodiment of the technology.

FIG. 6 is a schematic cross-sectional view of an inside of the wheel house 340 of the vehicle V including the airflow adjusting apparatus 1 according to the first example embodiment.

FIG. 6 illustrates a cross-sectional view of the inside of the wheel house 340 taken along a horizontal plane.

The inner surface of the wheel house 340 may include, for example but not limited to, a lateral-side surface portion 341, a front surface portion 342, and a rear surface portion 343.

The lateral-side surface portion 341 may be an inner wall portion that is disposed on inner side in the vehicle widthwise direction relative to the wheel W and that extends in each of a vehicle front-rear direction and an upper-lower direction.

The lateral-side surface portion 341 may be so disposed to oppose an upper half of the wheel W in the vehicle widthwise direction.

The front surface portion 342 may be an inner wall portion that is disposed on vehicle front side relative to the wheel W and that extends in the vehicle widthwise direction.

The rear surface portion 343 may be an inner wall portion that is disposed on vehicle rear side relative to the wheel W and that extends in the vehicle widthwise direction.

The front surface portion 342 and the rear surface portion 343 may be so disposed that the front surface portion 342 opposes a front portion of the tread 411 of the wheel W and the rear surface portion 343 opposes a rear portion of the tread 411 of the wheel W in the vehicle front-rear direction when the vehicle V travels straight.

The front-surface plasma actuator 43 may be so attached to the front surface portion 342 as to oppose the tread 411 of the wheel W. The front-surface plasma actuator 43 may generate an airflow F that flows in the vehicle widthwise direction.

The rear-surface plasma actuator 44 may be so attached to the rear surface portion 343 as to oppose the tread 411 of the wheel W. The rear-surface plasma actuator 44 may generate an airflow F that flows in the vehicle widthwise direction.

The front-surface plasma actuator 43 and the rear-surface plasma actuator 44 may each be an outward airflow generator that generates an airflow F that flows toward the outer side in the vehicle widthwise direction in the wheel house 340.

The lateral-side-surface front plasma actuator 45 and the lateral-side-surface rear plasma actuator 46 may be so attached to the lateral-side surface portion 341 as to be separated away from each other in the vehicle front-rear direction.

The lateral-side-surface front plasma actuator 45 and the lateral-side-surface rear plasma actuator 46 may each be a front-rear airflow generator that generates an airflow F in the vehicle front-rear direction.

The lateral-side-surface front plasma actuator 45 may be disposed on front side of the rotation central axis of the wheel W in a straight traveling direction. The lateral-side-surface rear plasma actuator 46 may be disposed on rear side of the rotation central axis of the wheel W of the straight traveling direction.

The lateral-side-surface front plasma actuator 45 and the lateral-side-surface rear plasma actuator 46 may mainly oppose the surface portion, of the upper half of the wheel W, on the inner side in the vehicle widthwise direction with a gap in the vehicle widthwise direction. The upper half of the wheel W may be a region above the rotation central axis, i.e., an axle.

Operation of the airflow adjusting apparatus 1 according to the first example embodiment will be described below.

The airflow adjusting apparatus 1 according to the first example embodiment may activate or deactivate the respective plasma actuators in accordance with a driving state and a traveling state of the vehicle V, and switch a generation direction of an airflow F in a case of activating the plasma actuators, thereby reducing air resistance, cooling the braking device, and improving driving stability, for example.

Figure 7:
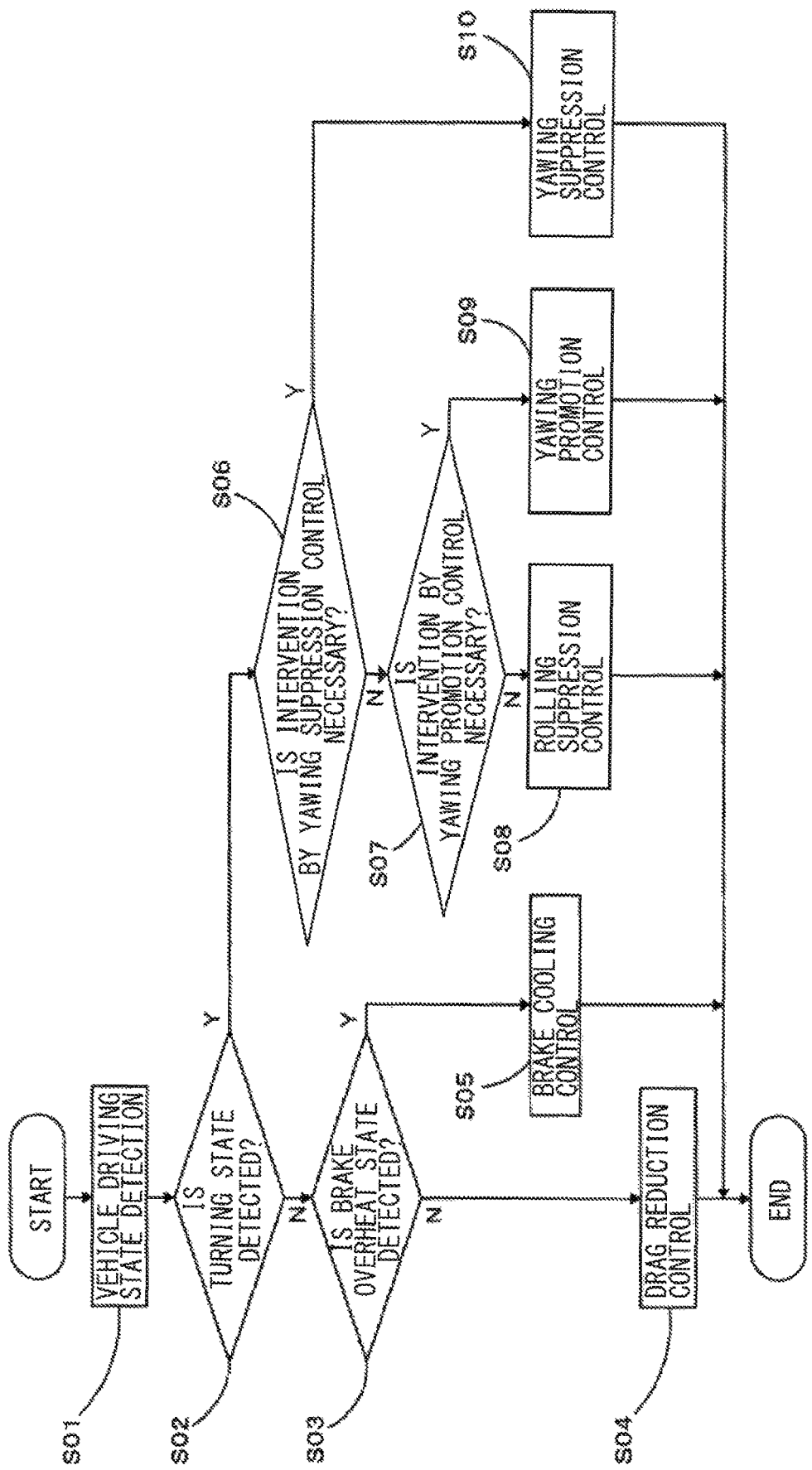
FIG. 7 is a flowchart illustrating an example of operation of the airflow adjusting apparatus.

FIG. 7 is a flowchart illustrating the operation of the airflow adjusting apparatus 1 according to the first example embodiment.

Respective steps will be described below in order.

[Step S01: Vehicle Driving State Detection]

The plasma actuator control unit 10 may acquire information regarding the driving state (or the traveling state) of the vehicle V from each of the sensors or any other device.

Non-limiting examples of the information regarding the driving state of the vehicle may include information regarding a vehicle speed, a steering angle, a yaw rate, lateral acceleration, estimated output torque of an engine provided by an unillustrated engine control unit, and a gear ratio (or a gear step) of a transmission provided by an unillustrated transmission control unit.

Thereafter, the process may be caused to proceed to Step S02.

[Step S02: Turning State Detection]

The plasma actuator control unit 10 may determine whether the vehicle V is in a turning state on the basis of the information acquired in Step S01.

In a case where the turning state is detected (Y in Step S02), the process may be caused to proceed to Step S06. In a case where the turning state is not detected, i.e., in a case where the vehicle V is in a straight traveling state (N in Step S02), the process may be caused to proceed to Step S03.

In one embodiment, the plasma actuator control unit 10 performing the process of Step S02 may serve as a "turning state detector".

[Step S03: Brake Overheat State Detection]

The plasma actuator control unit 10 may estimate a temperature of the braking device B (illustrated in FIG. 6) disposed on the inner diameter side of the rim 420 on the basis of a history of the brake fluid pressure acquired from the hydraulic control unit 24 via the behavior control unit 20.

In a case where the estimated temperature is equal to or higher than a predetermined threshold, the plasma actuator control unit 10 may determine that the vehicle V is in the brake overheat state requiring cooling of the braking device B (Y in Step S03), and the process may be caused to proceed to Step S05. In other cases (N in Step S03), the process may be caused to proceed to Step S4.

In one embodiment, the plasma actuator control unit 10 performing the process of Step S03 may serve as a "heat generation amount estimator".

[Step S04: Drag Reduction Control]

The plasma actuator control unit 10 may cause each of the plasma actuators to generate the airflow F, and thereby perform drag reduction control. The drag reduction control may involve reducing air resistance (i.e., drag) of the vehicle V.

Figure 8:
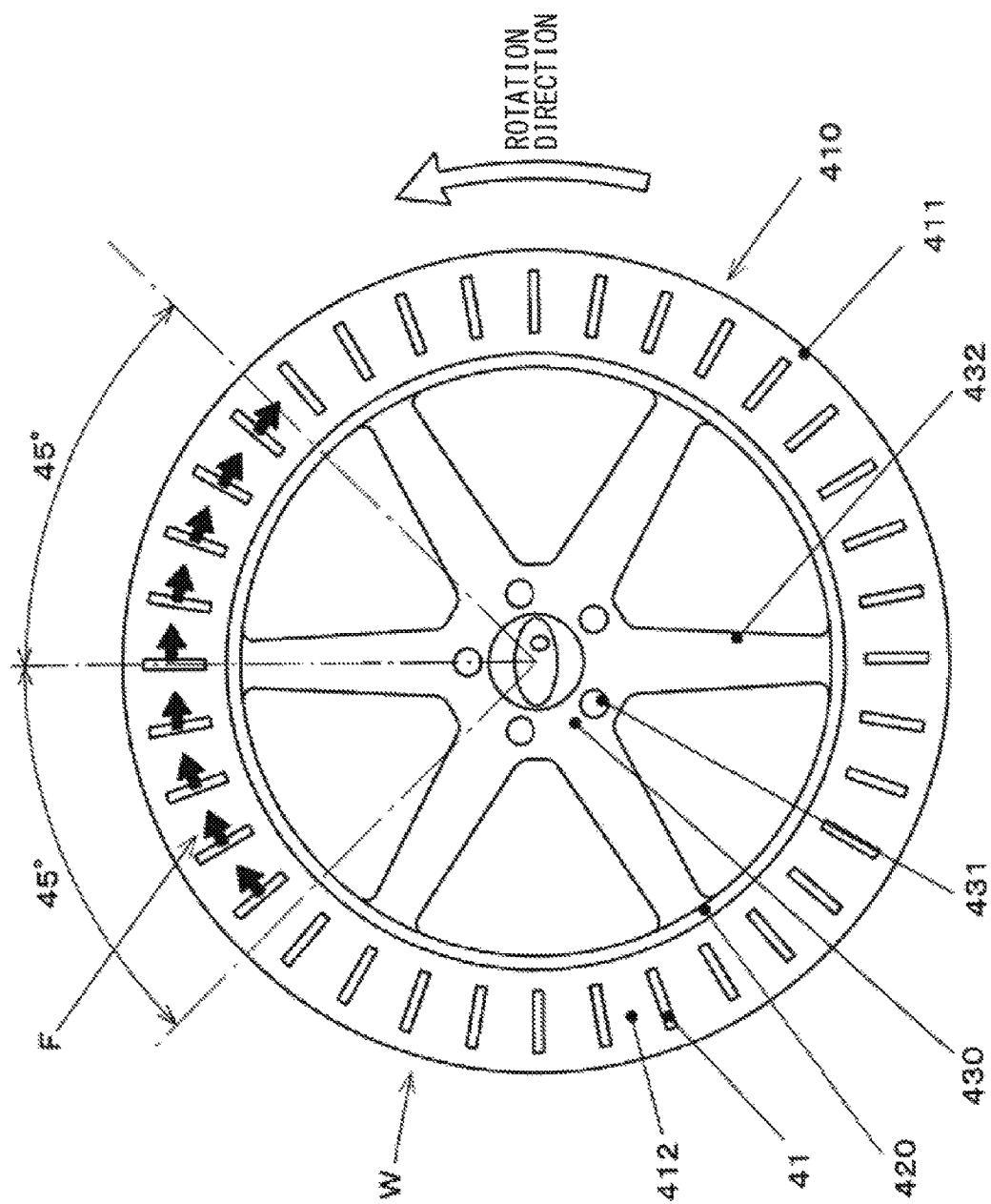
FIG. 8 is a diagram illustrating an example of an activation state of tire plasma actuators in a case where drag reduction control is performed by the airflow adjusting apparatus.

FIG. 8 illustrates an activation state of each of the tire plasma actuators 41 in a case where the drag reduction control is performed by the airflow adjusting apparatus 1 according to the first example embodiment.

The plasma actuator control unit 10 may cause each of the tire plasma actuators 41 disposed in a region above the rotation central axes of the right-front wheel Wfr, the left-front wheel Wfl, the right-rear wheel Wrr, and the left-rear wheel Wrl to generate an airflow F having a flow-velocity component toward the vehicle rear side.

The wheels W may move to the left side of FIG. 8 while rotating counterclockwise.

Upon performing the drag reduction control, the plasma actuator control unit 10 may cause each of the tire plasma actuators 41 that are present in a region within 45° on the front side and on the rear side, around a rotation center axis O of the wheel W, from a vertical line passing the rotation central axis O to generate the airflow F including the flow-velocity component toward the vehicle rear side. Such an airflow F may be indicated by a black arrow illustrated in FIG. 8.

At this time, intensity (i.e., a flow velocity) of the airflow F generated by each of the tire plasma actuators 41 may be so set as to increase in accordance with an increase in the vehicle speed of the vehicle V.

Under the drag reduction control, the airflows F may be generated in the pattern illustrated in FIG. 8 for all of the wheels W, i.e., all of the right-front wheel Wfr, the left-front wheel Wfl, the right-rear wheel Wrr, and the left-rear wheel Wrl.

This makes it possible to smoothly guide traveling wind, which is flowing from the vehicle front side, toward the vehicle rear side, around each of the wheels W, e.g., around the lateral-side surface portion of each of the wheels W.

Accordingly, it is possible to reduce generation of a turbulent flow accompanied by a vortex flow and reduce air resistance of the vehicle V.

Figure 9:
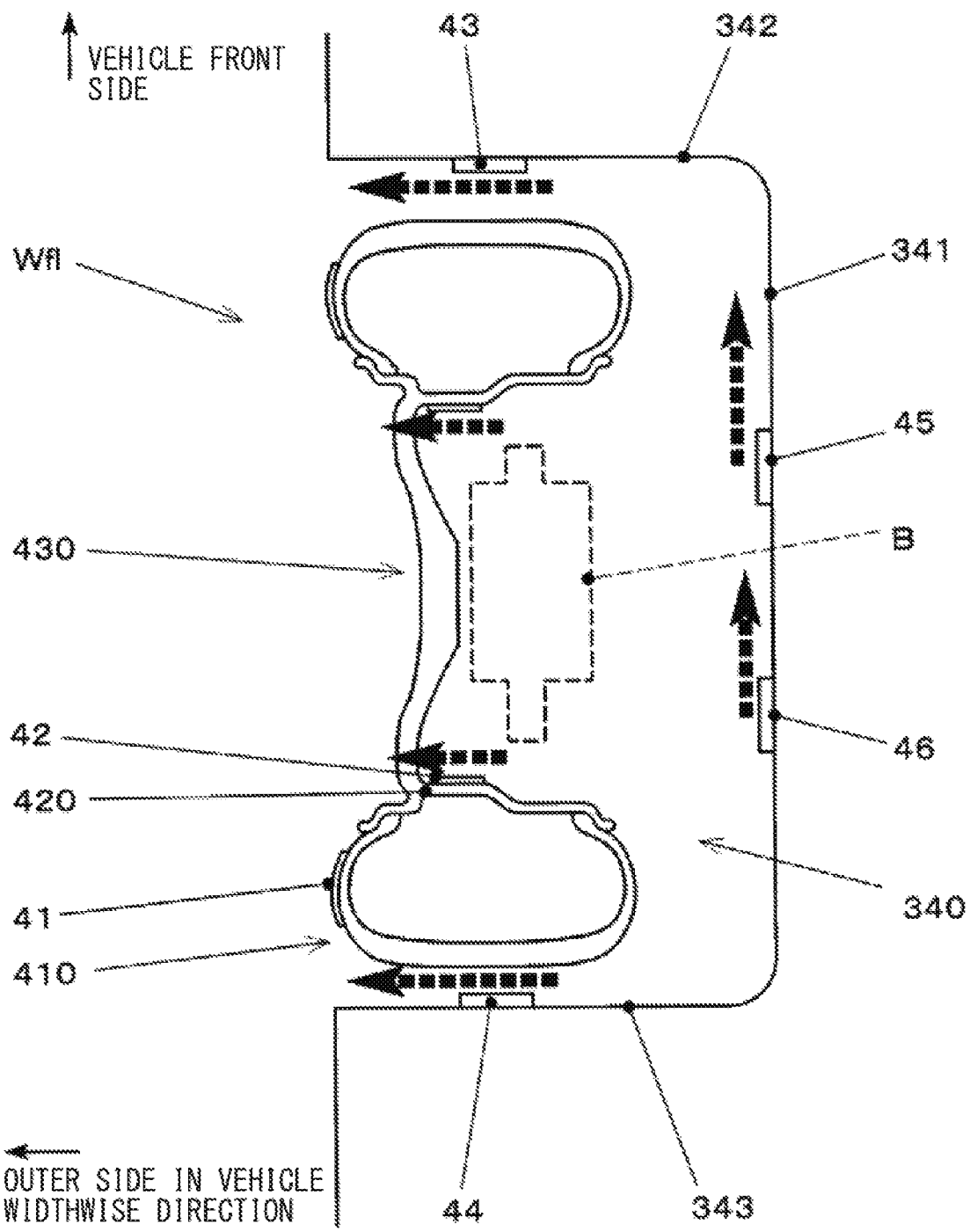
FIG. 9 is a schematic diagram illustrating an example of flow states of airflows generated in the wheel house by the airflow adjusting apparatus under the drag reduction control.

FIG. 9 schematically illustrates a state of the airflows F generated in the wheel house 340 by the airflow adjusting apparatus 1 according to the first example embodiment under the drag reduction control.

FIG. 9 illustrates a cross-section same as that illustrated in FIG. 6 described above. In FIG. 9, a thick dashed arrow indicates the airflow F generated by each of the plasma actuators. This is similarly applicable to FIG. 10 to be described later.

As illustrated in FIG. 9, under the drag reduction control, the rim inner-surface plasma actuator 42, the front-surface plasma actuator 43, and the rear-surface plasma actuator 44 may each generate an airflow F that flows toward the outer side in the vehicle widthwise direction.

The lateral-side-surface front plasma actuator 45 and the lateral-side-surface rear plasma actuator 46 may each generate an airflow F that flows toward the vehicle front side.

After performing the drag reduction control, the series of processes may be brought to an end or may be caused to return.

[Step S05: Brake Cooling Control]

The plasma actuator control unit 10 may cause each of the plasma actuators to generate the airflow F, and thereby perform brake cooling control. The brake cooling control may involve cooling of the braking device B provided on the inner diameter side of the rim 420.

Figure 10:
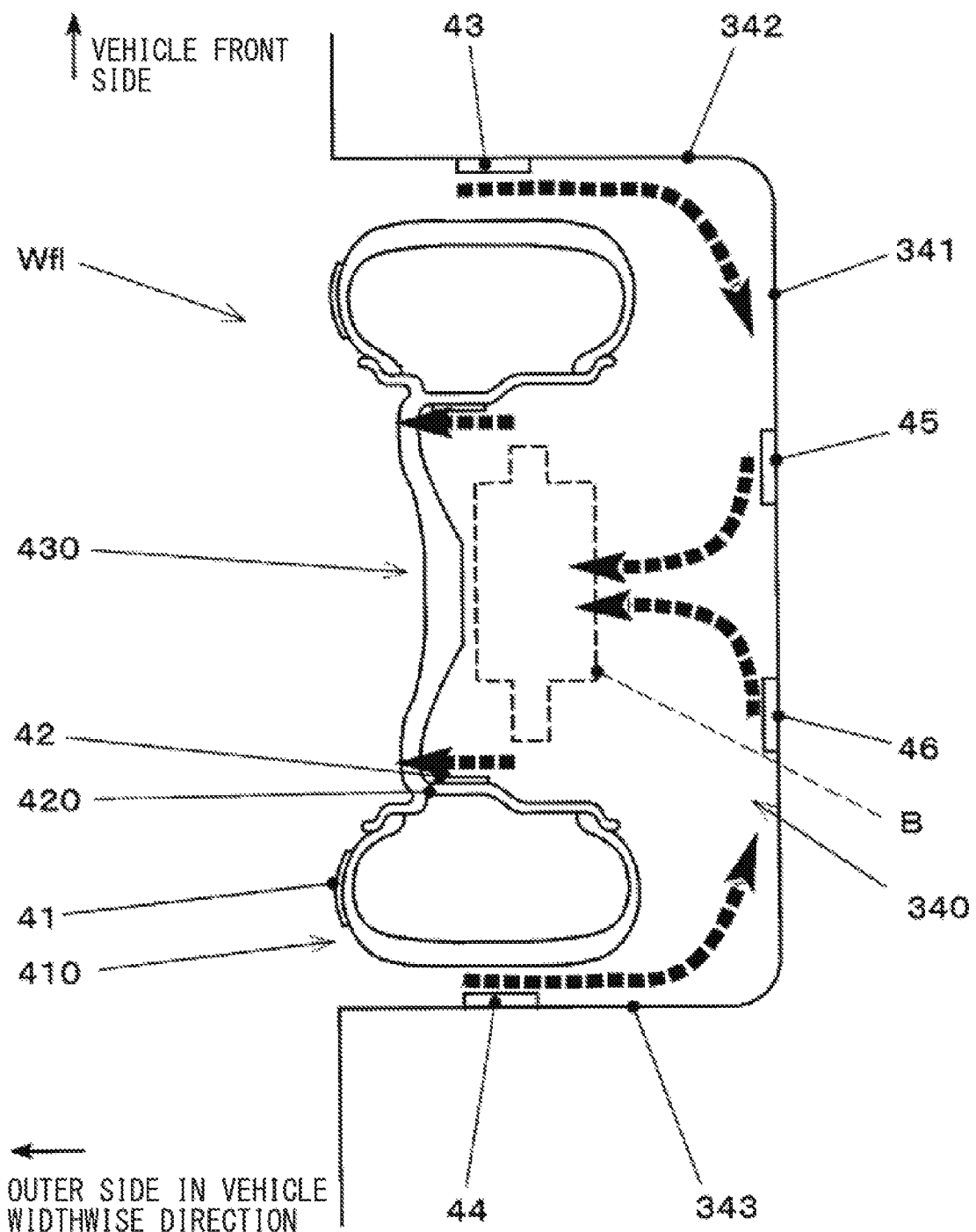
FIG. 10 is a schematic diagram illustrating an example of flow states of airflows generated in the wheel house by the airflow adjusting apparatus under brake cooling control.

FIG. 10 schematically illustrates a state of the airflows F generated in the wheel house 340 by the airflow adjusting apparatus 1 according to the first example embodiment under the brake cooling control.

As illustrated in FIG. 10, under the brake cooling control, the rim inner-surface plasma actuator 42 may generate an airflow F that flows toward the outer side in the vehicle widthwise direction.

The generation direction of the airflow F of each of the front-surface plasma actuator 43 and the rear-surface plasma actuator 44 may be reversed. Accordingly, the front-surface plasma actuator 43 and the rear-surface plasma actuator 44 may each generate an airflow F that flows toward the inner side in the vehicle widthwise direction.

The generation direction of the airflow F of the lateral-side-surface front plasma actuator 45 may be reversed. Accordingly, the lateral-side-surface front plasma actuator 45 may generate an airflow F that flows toward the vehicle rear side.

The lateral-side-surface rear plasma actuator 46 may generate an airflow F that flows toward the vehicle front side.

The airflows F generated by the lateral-side-surface front plasma actuator 45 and the lateral-side-surface rear plasma actuator 46 may interfere with or crash each other in the inner side of the rim 420 in the vehicle widthwise direction. This may cause a pressure in this region to be higher than that in a region around this region, thereby causing an airflow to be generated that flows toward the outer side in the vehicle widthwise direction.

This airflow may be introduced into the inner diameter side of the rim 420, may be accelerated by the rim inner-surface plasma actuators 42 in the inner diameter side of the rim 420, and may be discharged to lateral side of the vehicle V.

The lateral-side-surface front plasma actuator 45 and the lateral-side-surface rear plasma actuator 46 may operate in association with each other to serve as a rim direction airflow generator.

At this time, the braking device B may be cooled by heat exchange with the airflows F.

After the brake cooling control is performed, the series of processes may be brought to the end or may be caused to return.

[Step S06: Yawing Suppression Control Intervention Necessity Determination]

The plasma actuator control unit 10 may determine, on the basis of the information acquired in Step S01, whether it is necessary to perform yawing suppression control. The yawing suppression control may involve providing, to the vehicle body of the vehicle V, a yaw moment in a direction of suppressing yawing.

For example, in a case where the actual yaw rate is excessively greater than the target yaw rate of the vehicle V, i.e., in a case where a difference between the actual yaw rate and the target yaw rate is equal to or greater than a predetermined threshold, the plasma actuator control unit 10 may determine that the vehicle V is in the oversteer state and it is therefore necessary to perform the yawing suppression control.

The plasma actuator control unit 10 may also determine that it is necessary to perform the yawing suppression control in a case where it is necessary to improve stability of the vehicle V when the vehicle V is steadily turning.

In a case where the plasma actuator control unit 10 determines that it is necessary to perform the yawing suppression control (Y in Step S06), the process may be caused to proceed to Step S10. In a case where the plasma actuator control unit 10 determines that it is not necessary to perform the yawing suppression control (N in Step S06), the process may be caused to proceed to Step S07.

[Step S07: Yawing Promotion Control Intervention Necessity Determination]

The plasma actuator control unit 10 may determine, on the basis of the information acquired in Step S01, whether it is necessary to perform yawing promotion control. The yawing promotion control may involve providing, to the vehicle body of the vehicle V, a yaw moment in a direction of promoting yawing.

For example, in a case where the actual yaw rate is excessively smaller than the target yaw rate of the vehicle V, i.e., in a case where the difference between the actual yaw rate and the target yaw rate is equal to or greater than a predetermined threshold, the plasma actuator control unit 10 may determine that the vehicle V is in the understeer state and it is therefore necessary to perform the yawing promotion control.

The plasma actuator control unit 10 may also determine that it is necessary to perform the yawing promotion control in a case where it is necessary to quicken a rise of yawing of the vehicle body when the vehicle V is in an initial period of turning, i.e., when the vehicle V is turning in.

In a case where the plasma actuator control unit 10 determines that it is necessary to perform the yawing promotion control (Y in Step S07), the process may be caused to proceed to Step S09. In a case where the plasma actuator control unit 10 determines that it is not necessary to perform the yawing promotion control (N in Step S07), the process may be caused to proceed to Step S08.

[Step S08: Rolling Suppression Control]

The plasma actuator control unit 10 may perform the following rolling suppression control.

When a general vehicle is traveling, a pressure on a lateral-side surface portion of the vehicle is a negative pressure that is relatively lower than an atmospheric pressure. In the rolling suppression control, the yawing promotion control, or the yawing suppression control according to the first example embodiment, behavior of the vehicle may be controlled by using the airflows F generated by the respective plasma actuators to promote or suppress the negative pressure on the lateral-side surface portion of the vehicle body.

Figure 11:
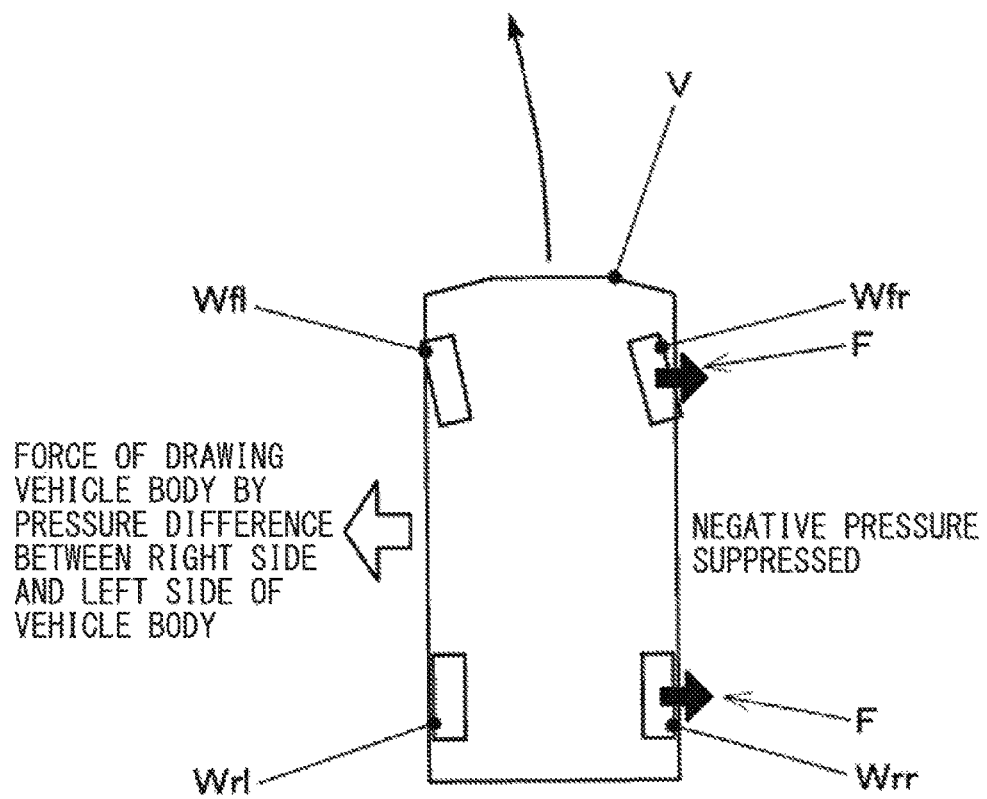
FIG. 11 is a diagram illustrating an example of a state of the vehicle in a case where rolling suppression control is performed by the airflow adjusting apparatus.

FIG. 11 illustrates an example of a state of the vehicle V in a case where the rolling suppression control is being performed by the airflow adjusting apparatus 1 according to the first example embodiment.

FIG. 11 illustrates a state of the vehicle V traveling on a left-hand curved road. In this state, the right-front wheel Wfr and the right-rear wheel Wrr may be the turning outer wheels while the left-front wheel Wfl and the left-rear wheel Wrl may be the turning inner wheels. This is similarly applicable to FIGS. 12 to 16 to be described later. In a case of the steady turning, the vehicle body of the vehicle V may yaw (i.e., exhibit yaw behavior) in such a manner that the vehicle body pivots in a counterclockwise direction when viewed from above.

In the state illustrated in FIG. 11, the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the right-front wheel Wfr and the right-rear wheel Wrr serving as the turning outer wheels may be activated. The rim inner-surface plasma actuator 42, the front-surface plasma actuator 43, the rear-surface plasma actuator 44, the lateral-side-surface front plasma actuator 45, and the lateral-side-surface rear plasma actuator 46 may each thereby generate traveling wind that flows toward the outer side in the vehicle widthwise direction.

Accordingly, a jet of an airflow may be generated from the front and the rear wheel houses 340 on the right side of the vehicle body toward the outer side in the vehicle widthwise direction. As a result, the negative pressure acting on the lateral-side surface portion on the right side of the vehicle body may be suppressed.

In contrast, such a jet of the airflow generated by the plasma actuators may not be generated around a lateral-side surface portion on the left side of the vehicle body. As a result, the negative pressure acting on the lateral-side surface portion on the left side of the vehicle body may not be suppressed.

This may result in generation of a difference between a pressure applied by air to the lateral-side surface portion on the left side of the vehicle body and a pressure applied by air to the lateral-side surface portion on the right side of the vehicle body. This difference in pressure may result in generation of force that draws the vehicle body toward the turning inner wheel side.

Such force may act on a portion above a rolling center of the vehicle in general. Therefore, a roll moment in a direction of suppressing rolling of the vehicle body may be generated, reducing a roll angle.

Note that, instead of completely deactivating the respective plasma actuators on the turning inner wheel side as described above, an airflow having intensity and a flow velocity that are lower than those on the turning outer wheel side may be generated on the turning inner wheel side. This is similarly applicable to the yawing promotion control and the yawing suppression control to be described later.

In a case where centripetal acceleration acting on the vehicle body during turning is great and it is therefore necessary to further increase a rolling suppression effect, the following control may be performed.

Figure 12:
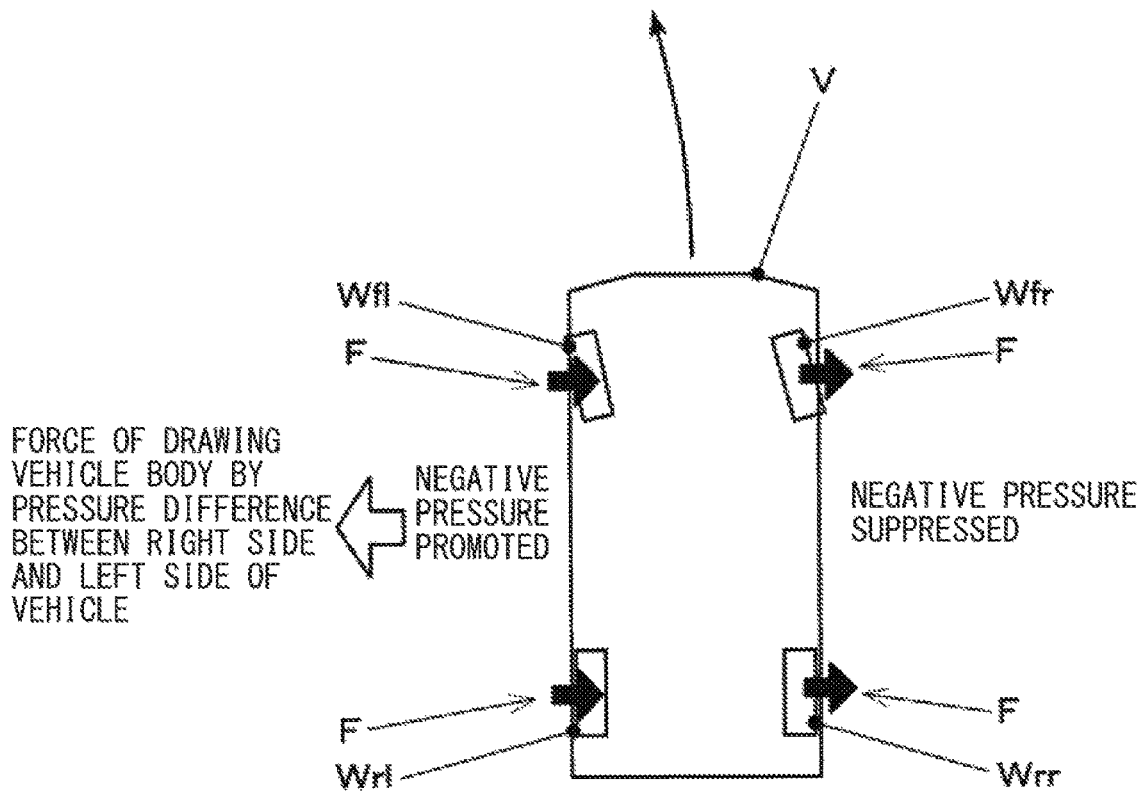
FIG. 12 is a diagram illustrating another example of the state of the vehicle in a case where the rolling suppression control is performed by the airflow adjusting apparatus.

FIG. 12 illustrates another example of the state of the vehicle V in the case where the rolling suppression control is being performed by the airflow adjusting apparatus 1 according to the first example embodiment.

In the state illustrated in FIG. 12, control that is similar to the control illustrated in FIG. 11 may be performed. In addition, the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the left-front wheel Wfl and the left-rear wheel Wrl serving as the turning inner wheels may be so driven as to generate an airflow F in a direction opposite to that of the above-described turning outer wheel side, i.e., may be so driven as to generate an airflow F that flows toward the inner side in the vehicle widthwise direction. As a result, the negative pressure acting on the side surface of the vehicle body may be promoted on the left side of the vehicle body.

This may result in an increase in the difference between the pressure applied by air to the lateral-side surface portion on the left side of the vehicle body and the pressure applied by air to the lateral-side surface portion on the right side of the vehicle body. Such an increase in difference in pressure may increase the force that draws the vehicle body toward the turning inner wheel side, compared to the state illustrated in FIG. 11.

This makes it possible to obtain a higher rolling suppression effect.

After the rolling suppression control is performed, the series of processes may be brought to the end or may be caused to return.

[Step S09: Yawing Promotion Control]

The plasma actuator control unit 10 may perform the following yawing promotion control.

Figure 13:
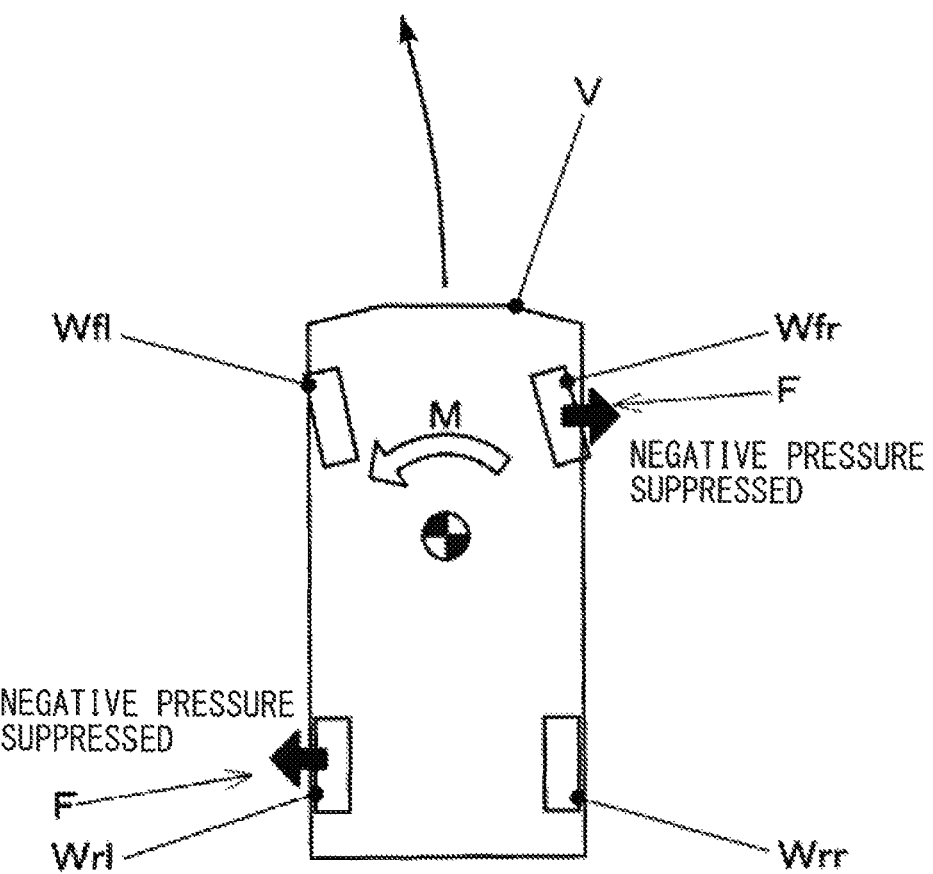
FIG. 13 is a diagram illustrating an example of a state of the vehicle in a case where yawing promotion control is performed by the airflow adjusting apparatus.

FIG. 13 illustrates an example of a state of the vehicle V in a case where the yawing promotion control is being performed by the airflow adjusting apparatus 1 according to the first example embodiment.

In the state illustrated in FIG. 13, only the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the right-front wheel Wfr serving as a turning front outer wheel and the left-rear wheel Wrl serving as a turning rear inner wheel may be activated to generate an airflow that flows toward the outer side in the vehicle widthwise direction.

This may result in generation of a difference in a pressure applied by air to the lateral-side surface portion on the left side and the right side of the vehicle body between the front side of the vehicle body and the rear side of the vehicle body. This difference in pressure may result in generation of force that draws the front portion of the vehicle body toward the turning inner wheel side and force that draws the rear portion of the vehicle body toward the turning outer wheel side.

Such force may act in opposite directions between the front portion of the vehicle body and the rear portion of the vehicle body. Therefore, a yaw moment M in a direction of promoting yawing of the vehicle body may be generated, thereby promoting the yawing.

In a case where the yaw moment M necessary to control behavior of the vehicle V is great, for example, in a case where the degree of understeer is great, the following control may be performed.

Figure 14:
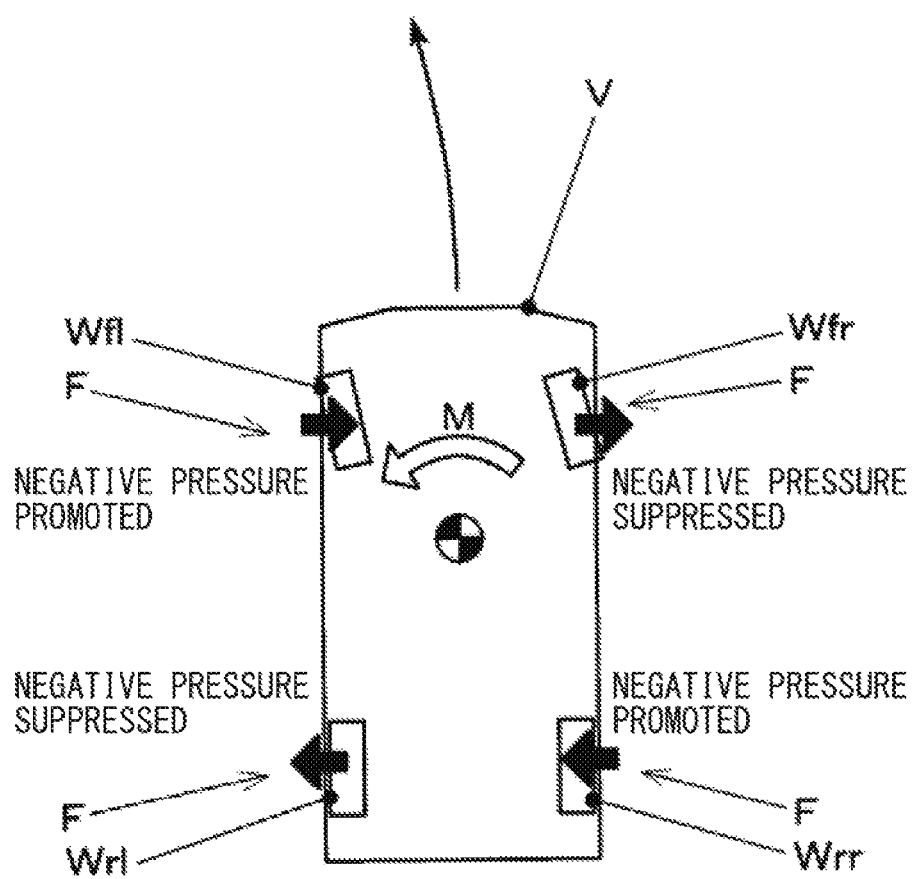
FIG. 14 is a diagram illustrating another example of the state of the vehicle in a case where the yawing promotion control is performed by the airflow adjusting apparatus.

FIG. 14 illustrates another example of the state of the vehicle V in the case where the yawing promotion control is being performed by the airflow adjusting apparatus 1 according to the first example embodiment.

In the state illustrated in FIG. 14, control that is similar to the control illustrated in FIG. 13 may be performed. In addition, the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the left-front wheel Wfl serving as the turning front inner wheel and the right-rear wheel Wrr serving as the turning rear outer wheel may be so driven as to generate an airflow that flows toward the inner side in the vehicle widthwise direction.

This may result in an increase in the difference between the pressure applied by air to the lateral-side surface portion on the left side of the vehicle body and the pressure applied by air to the lateral-side surface portion on the right side of the vehicle body. Such an increase in difference in pressure may increase the generated yaw moment M, compared to the state illustrated in FIG. 13.

This makes it possible to obtain a higher yawing promotion effect.

After the yawing promotion control is performed, the series of processes may be brought to the end or may be caused to return.

[Step S10: Yawing Suppression Control]

The plasma actuator control unit 10 may perform the following yawing suppression control.

Figure 15:
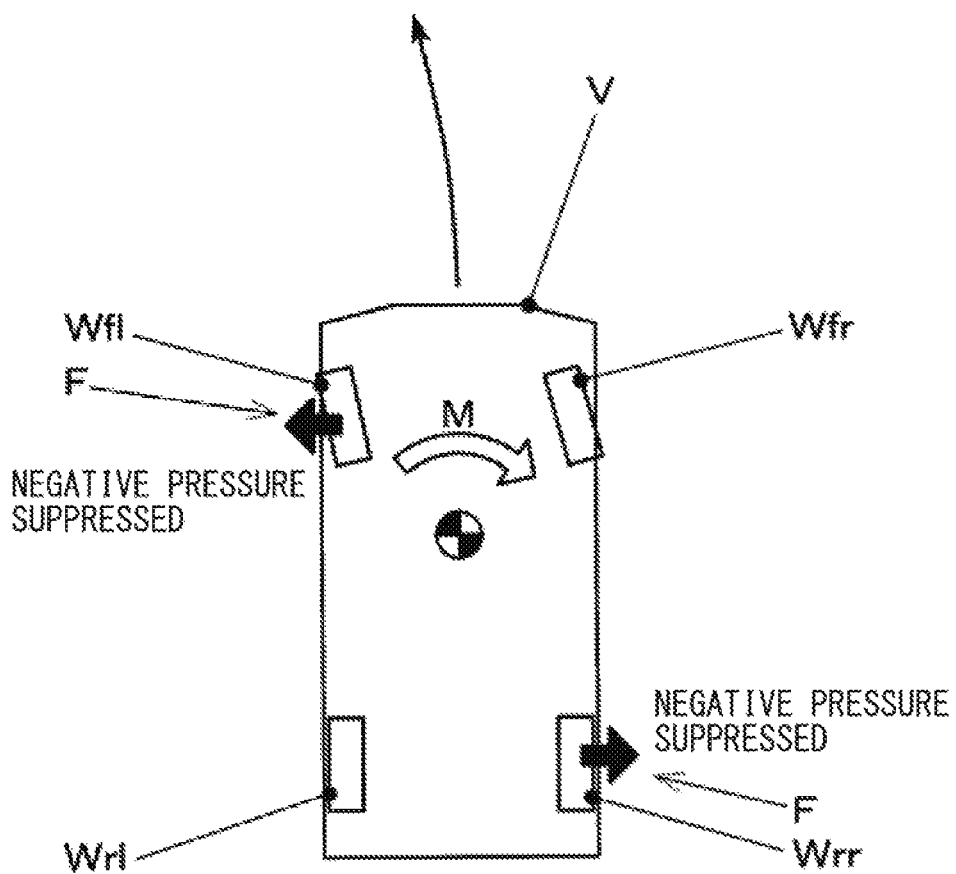
FIG. 15 is a diagram illustrating an example of a state of the vehicle in a case where yawing suppression control is performed by the airflow adjusting apparatus.

FIG. 15 illustrate an example of a state of the vehicle V in a case where the yawing suppression control is being performed by the airflow adjusting apparatus 1 according to the first example embodiment.

In the state illustrated in FIG. 15, only the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the left-front wheel Wfl serving as the turning front inner wheel and the right-rear wheel Wrr serving as the turning rear outer wheel may be so activated as to generate an airflow that flows toward the outer side in the vehicle widthwise direction.

This may result in generation of a difference in a pressure applied by air to the lateral-side surface portion on the left side and on the right side of the vehicle body between the front side of the vehicle body and the rear side of the vehicle body. This difference in pressure may result in generation of force that draws the front portion of the vehicle body toward the turning outer wheel side and force that draws the rear portion of the vehicle body toward the turning inner wheel side.

Such force may act in opposite directions between the front portion of the vehicle body and the rear portion of the vehicle body. Therefore, a yaw moment M in a direction of suppressing the yawing of the vehicle body may be generated, thereby suppressing the yawing.

Figure 16:
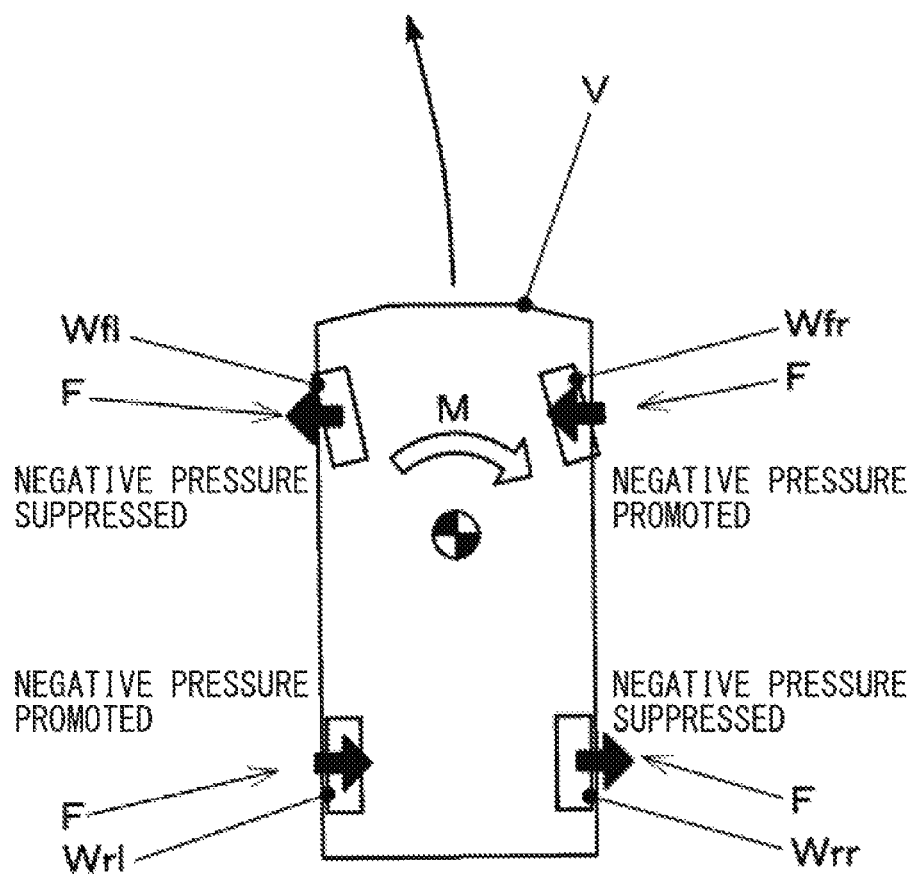
FIG. 16 is a diagram illustrating another example of the state of the vehicle in a case where the yawing suppression control is performed by the airflow adjusting apparatus.

In a case where the yaw moment M necessary to control the behavior of the vehicle V is great, for example, in a case where the degree of oversteer is great, the following control may be performed FIG. 16 illustrates another example of the state of the vehicle V in the case where the yawing suppression control is being performed by the airflow adjusting apparatus 1 according to the first example embodiment.

In the state illustrated in FIG. 16, control that is similar to the control illustrated in FIG. 15 may be performed. In addition, the rim inner-surface plasma actuator 42, the front-surface plasma actuator 43, the rear-surface plasma actuator 44, the lateral-side-surface front plasma actuator 45, and the lateral-side-surface rear plasma actuator 46 that are provided on each of the right-front wheel Wfr serving as the turning front outer wheel and the left-rear wheel Wrl serving as the turning rear inner wheel may be so driven as to generate an airflow that flows toward the inner side in the vehicle widthwise direction.

This may result in an increase in the difference between the pressure applied by air to the lateral-side surface portion on the left side of the vehicle body and the pressure applied by air to the lateral-side surface portion on the right side of the vehicle body. Such an increase in difference in pressure may increase the generated yaw moment M, compared to the state illustrated in FIG. 15.

This makes it possible to obtain a higher yawing suppression effect.

After the yawing suppression control is performed, the series of processes may be brought to the end or may be caused to return.

As described above, according to the first example embodiment of the present technology, the following effects are achieved.

In a wheel house that provides a wheel containing section of a vehicle body, a rotating wheel stirs an airflow that flows into the wheel house via a lower portion of the vehicle body, such as an underbody, generating a turbulent flow exhibiting complicated behavior. As with a turbulent flow generated in the vicinity of a surface of the vehicle body, the turbulent flow generated in the wheel house can be one cause of increasing air resistance of the vehicle, and can be one cause of deteriorating aerodynamic noise and aerodynamic vibration. Therefore, it is desired to appropriately adjust an airflow in the wheel house in order to improve an aerodynamic performance of the vehicle.

(1) The airflow generator provided in the wheel house 340 may be caused to induce an airflow to generate an airflow that flows from the inside of the wheel house 340 toward the outer side in the vehicle widthwise direction. This makes it possible to guide air, staying in the wheel house 340, toward the outer side in the vehicle widthwise direction and thereby promote discharge of the air to the lateral side of the vehicle V. Non-limiting examples of the airflow generator may include the front-surface plasma actuator 43, the rear-surface plasma actuator 44, the lateral-side-surface front plasma actuator 45, the lateral-side-surface rear plasma actuator 46, and the rim inner-surface plasma actuator 42.

(2) The front-surface plasma actuator 43 and the rear-surface plasma actuator 44 may be provided respectively on the front surface portion 342 and the rear surface portion 343 of the wheel house 340. The front-surface plasma actuator 43 and the rear-surface plasma actuator 44 may be caused to generate airflows F that flow toward the outer side in the vehicle widthwise direction along the front surface portion 342 and the rear surface portion 343, respectively. This makes it possible to appropriately achieve the effect (1) described above.

(3) Upon turning of the vehicle V, the flow velocity of the airflow generated by the airflow generator provided on the outer wheel side may be caused to be higher, thereby promoting discharge of air from the wheel house 340 provided on the outer wheel side. This allows the pressure applied by ambient air to the lateral-side surface portion of the vehicle body on the outer wheel side to be relatively higher than the pressure applied to the lateral-side surface portion of the vehicle body on the inner wheel side. This generates a roll moment in a direction of suppressing rolling behavior at the time of turning and thereby reduces a roll angle of the vehicle body, making it possible to improve driving stability. Here, causing the flow velocity of the airflow generated by the airflow generator provided on the outer wheel side to be higher than the flow velocity of the airflow generated by the airflow generator provided on the inner wheel side may include stopping of generation of the airflow by the airflow generator provided on the inner wheel side.

(4) Upon the turning of the vehicle V the generation direction of the airflow generated by the airflow generator provided on the inner wheel side may be reversed to draw air toward the inside of the wheel house 340 provided on the inner wheel side. This causes the pressure applied by ambient air to the lateral-side surface portion of the vehicle body on the outer wheel side to be relatively higher than the pressure applied to the lateral-side surface portion of the vehicle body on the inner wheel side. This generates a roll moment in a direction of suppressing the rolling behavior at the time of turning and thereby reduces the roll angle of the vehicle body, making it possible improve driving stability.

(5) In a case where the vehicle V is turning, a flow-velocity component that is directed toward a centrifugal side may be varied between an airflow generated by the airflow generators provided in the respective wheel houses 340 of the front wheels and an airflow generated by the airflow generators provided in the respective wheel houses 340 of the rear wheels. Non-limiting examples of the airflow generators provided in the wheel houses 340 of the front wheels may include the plasma actuators provided in the wheel houses 340 of the left-front wheel Wfl and the right-front wheel Wfr illustrated in FIG. 13. Non-limiting examples of the airflow generators provided in the wheel houses 340 of the rear wheels may include the plasma actuators provided in the wheel houses 340 of the left-rear wheel Wrl and the right-rear wheel Wrr illustrated in FIG. 13. In other words, in the case where the vehicle V is turning, a ratio of a centrifugal component of a flow velocity between the airflow generators on the front wheel Wfl and Wfr side and the airflow generators on the rear wheel Wrl and Wrr side may be varied with respect to that in a case where the vehicle V is not turning. This allows balance of the pressure applied by the ambient air to the lateral-side surface portions of the vehicle body between the outer wheel side and the inner wheel side to be varied between the front and the rear portions of the vehicle body. This generates a yaw moment in the direction of promoting yawing operation of the vehicle body (in other words, in a direction of increasing the yaw rate) or in the direction of suppressing the yawing operation of the vehicle body (in other words, in a direction of reducing the yaw rate), and thereby suppresses understeer behavior of the vehicle V or suppresses oversteer behavior of the vehicle V. Here, varying the ratio of the flow velocity of the airflows generated by the airflow generators provided on the front outer wheel side and the flow velocity of the airflows generated by the airflow generators provided on the rear outer wheel side upon the turning (in other words, a difference between the front side and the rear side) may include stopping of generation of the airflows by the airflow generators provided on the front outer wheel side or the airflow generators provided on the rear outer wheel side.

(6) The lateral-side-surface front plasma actuator 45 and the lateral-side-surface rear plasma actuator 46 may be provided on the surface portion, of the inner surface of the wheel house 340, on the lateral side of the wheel W. The lateral-side-surface front plasma actuator 45 and the lateral-side-surface rear plasma actuator 46 may be caused to generate an airflow along the surface portion on the lateral side in the vehicle front-rear direction. This allows air staying in the wheel house 340 to be guided toward the front side or the rear side of the wheel W, making it possible to promote discharge of the air to the lateral side of the vehicle V from the front or the rear side of the wheel W.

(7) The lateral-side-surface front plasma actuator 45 and the lateral-side-surface rear plasma actuator 46 may each be provided on a portion, of the surface portion of the wheel house 340, on the lateral side of the wheel W, that opposes the upper half of the wheel W. The lateral-side-surface front plasma actuator 45 and the lateral-side-surface rear plasma actuator 46 may be caused to generate an airflow that flows toward the front side of the wheel W. This makes it possible to guide air in the wheel house 340 in a rotation direction of the upper half of the wheel W when the upper half of the wheel W rotates toward the front side of the vehicle V while the vehicle V travels forward. Accordingly, it is possible to reduce turbulence of an airflow caused when air is stirred by the upper half of the wheel W in the wheel house 340.

(8) A generation direction of the airflow F generated by the lateral-side-surface front plasma actuator 45 and a generation direction of the airflow F generated by the lateral-side-surface rear plasma actuator 46 may be caused to oppose each other. These airflows F may be caused to be generated toward the inner diameter side of the rim 420 of the wheel W. This makes it possible to discharge air in the wheel house 340 from the inner diameter side of the rim 420 toward the outside. Accordingly, it is possible to promote discharge of the air to the lateral side of the vehicle V.

In addition, it is possible to improve a performance of cooling equipment or a member that is disposed on the inner diameter side of the rim 420 and that may be accompanied by heat generation. Non-limiting examples of such equipment or a member may include the braking device B and an in-wheel motor.

(9) The rim inner-surface plasma actuator 42 may be provided on the inner peripheral surface of the rim 420. The rim inner-surface plasma actuator 42 may be caused to generate an airflow F that flows along the inner peripheral surface of the rim 420 toward the outer side in the vehicle widthwise direction. This makes it possible to discharge air in the wheel house 340 from the inner diameter side of the rim 420 toward the outside. Accordingly, it is possible to promote discharge of the air to the lateral side of the vehicle V.

In addition, it is possible to improve a performance of cooling equipment or a member that is disposed on the inner diameter side of the rim 420 and that may be accompanied by heat generation. Non-limiting examples of such equipment or a member may include the braking device B and the in-wheel motor.

(10) Generating an airflow by means of the lateral-side-surface front plasma actuator 45, the lateral-side-surface rear plasma actuator 46, or the rim inner-surface plasma actuator 42, i.e., generating an airflow that flows through the inner diameter side of the rim 420, in accordance with a heat generation amount of equipment or a member, may be suspended while the equipment or the member has a small heat generation amount. Accordingly, while the equipment or the member has the small heat generation amount, an airflow stirred by a member such as the spoke may be discharged from the inner diameter side of the rim 420. This makes it possible to reduce occurrence of turbulence in an airflow on the lateral side of the vehicle body. Non-limiting examples of the equipment or the member may include the braking device B. For example, such an airflow may be generated when the braking device B is overheated.

(11) The plasma actuator 100 may be adopted as the airflow generator. This makes it possible to generate the airflow with favorable responsiveness by means of a simple and robust configuration having no movable part. As a result, it is possible to stably achieve the above-described effects.

As described above, it is possible to provide an airflow adjusting apparatus that appropriately adjusts an airflow in a wheel house.

An airflow adjusting apparatus according to another example embodiment of the technology will be described below. In the following description, elements that are similar to those described above in the first example embodiment are each denoted with a reference sign same as that used in the first example embodiment, and description thereof will be omitted. Points different from the first example embodiment are mainly described below.

Second Example Embodiment

An airflow adjusting apparatus according to a second example embodiment may be obtained by replacing some or all of the two-electrode plasma actuators 100 according to the first example embodiment with three-electrode plasma actuators 100A.

Figure 17:
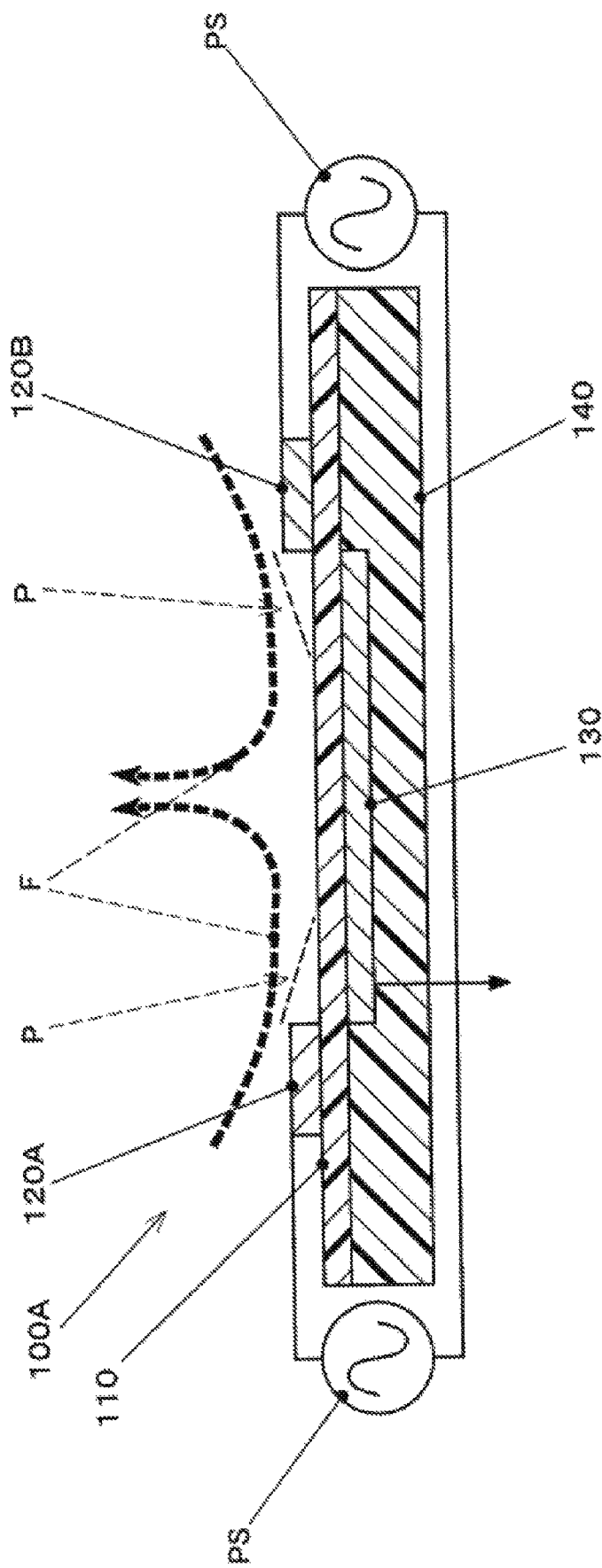
FIG. 17 is a schematic cross-sectional view of an example of a three-electrode plasma actuator to be included in an airflow adjusting apparatus according to one example embodiment of the technology.

FIG. 17 is a cross-sectional view of the three-electrode plasma actuator 100A to be included in the airflow adjusting apparatus according to the second example embodiment.

The three-electrode plasma actuator 100A illustrated in FIG. 17 may include a pair of upper electrodes 120, i.e., an upper electrode 120A and an upper electrode 120B, and power supplies PS. The upper electrodes 120 may be symmetrically disposed on both sides of the lower electrode 130. The power supplies PS may be independently provided for the respective upper electrodes 120A and 120B.

For example, such a three-electrode plasma actuator 100A may be configured to generate airflows F that oppose each other by means of plasma P formed between the upper electrode 120A and the lower electrode 130 and plasma P formed between the upper electrode 120B and the lower electrode 130.

In this case, the opposing airflows F may crash and join each other, and the joined airflows may be deflected. This may allow an airflow to be formed or combined that flows in a direction away from a principal plane of the plasma actuator 100A, which may be typically a direction of a normal to the principal plane of the plasma actuator 100A.

Moreover, as with the two-electrode plasma actuator 100 described above, the three-electrode plasma actuator 100A may be configured to form an airflow that flows along its surface by causing electricity to pass through only one of the upper electrodes 120, i.e. through the upper electrode 120A or the upper electrode 120B.

Moreover, the three-electrode plasma actuator 100A may be also configured to control the flow direction of the combined airflows by controlling a factor such as a voltage applied to each of the upper electrodes 120A and 120B.

According to the second example embodiment, the three-electrode plasma actuator 100A may be used as the tire plasma actuator 41, for example. This allows an airflow to be generated that flows from a side wall of a tire directly toward the outer side in the vehicle widthwise direction, in a case of performing control such as the rolling suppression control, the yawing promotion control, or the yawing suppression control, for example. Accordingly, it is possible to enhance the effect of improving driving stability.

According to the first example embodiment, the airflows F outputted from the lateral-side-surface front plasma actuator 45 and the lateral-side-surface rear plasma actuator 46 may be caused to interfere with each other, to thereby generate airflows oriented to the inner diameter side of the rim 420. Alternatively, one or more three-electrode plasma actuators 100A may be provided to directly generate the airflows oriented to the inner diameter side of the rim 420.

As described above, according to the second example embodiment, the three-electrode plasma actuator 100A may be used that is configured to vary a flow direction of an airflow by itself. Accordingly, it is possible to increase a degree of freedom of the airflow control, and to thereby further enhance the airflow adjustment effects achieved by the airflow adjusting apparatus.

Modifications

The technology is by no means limited to the example embodiments described above. It should be appreciated that modifications and alterations may be made, and the technology is intended to include such modifications and alterations in so far as they fall within the scope of the appended claims or the equivalents thereof.

(1) The configurations of the airflow adjusting apparatus and the vehicle are not limited to those described in the example embodiments above, and may be appropriately changed.

For example, the arrangement of the airflow generators (plasma actuators), the number of airflow generators (plasma actuators), the generation directions of airflows, methods of controlling the airflows, etc. may be appropriately changed.

The plasma actuators provided on the wheel may be attached to, for example but not limited to: the side wall on the inner side in the vehicle widthwise direction; a surface on the outer side in the vehicle widthwise direction of the spoke section; a surface on the inner side in the vehicle widthwise direction of the spoke section; or a lateral-side surface portion of the spoke section.

Moreover, the installation position of the plasma actuator provided in the wheel house is not limited to the inner surface (i.e., the inner wall portion) of the wheel house. The plasma actuator may be attached, for example, to a component such as a suspension that is provided in the wheel house.

(2) According to each of the example embodiments described above, the plasma actuator may be used as the airflow generator. However, the configuration of the airflow generator is not limited thereto.

For example, any other type of device may be used as the airflow generator. Non-limiting examples of such a device of other type may include: a blower such as a blower fan; and a device that outputs a jet of an airflow compressed by a device such as a compressor.

(3) The methods of controlling each of the plasma actuators used at the time of turning or in any other situation may be mere examples, and may be appropriately changed.

(4) According to each of the example embodiments, the braking device may be provided on the inner diameter side of the rim to improve a performance of cooling the braking device by airflow control. However, a device to be cooled that is provided on the inner diameter side of the rim is not limited thereto, and may be appropriately changed.

For example, a configuration may be adopted that cools the in-wheel motor (i.e., the motor generator) that is a rotating electrical machine disposed on the inner diameter side of the rim.

Each of the plasma actuator control unit 10, the behavior control unit 20, the hydraulic control unit 24, and the electric power steering control unit 30 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the plasma actuator control unit 10, the behavior control unit 20, the hydraulic control unit 24, and the electric power steering control unit 30 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the plasma actuator control unit 10, the behavior control unit 20, the hydraulic control unit 24, and the electric power steering control unit 30 illustrated in FIG. 2.

The invention claimed is:

1. An airflow adjusting apparatus to be installed in a vehicle, the apparatus comprising:
   an airflow generator that is provided on an inner surface of a wheel house or on a wheel, the wheel house providing a wheel containing section of a vehicle body, the wheel being contained in the wheel containing section, the airflow generator being configured to generate an airflow that flows from the wheel containing section toward an outer side in a vehicle widthwise direction; and
   a controller configured to control the airflow generator.

2. The airflow adjusting apparatus according to claim 1, wherein the airflow generator comprises a first airflow generator, the first airflow generator being provided at least on: a surface portion, of the inner surface of the wheel house, on a front side of the wheel; or a surface portion, of the inner surface of the wheel house, on a rear side of the wheel; the first airflow generator being configured to generate an airflow along the surface portion on which the first airflow generator is provided.

3. The airflow adjusting apparatus according to claim 1, further comprising
   a turning state detector configured to detect a turning state of a vehicle; and
   a second airflow generator, wherein
   the controller is configured to cause, when the vehicle is turning, a flow velocity of an airflow generated by one of the airflow generator and the second airflow generator provided on a turning outer wheel side to be higher than a flow velocity of an airflow generated by the other of the airflow generator and the second airflow generator provided on a turning inner wheel side.

4. The airflow adjusting apparatus according to claim 3, wherein the controller is configured to vary, in a case where the vehicle is turning, a flow-velocity component that is directed toward a centrifugal side between an airflow generated by one of the airflow generator and the second airflow generator provided on a wheel house of a front wheel or on the front wheel and an airflow generated by the other of the airflow generator and the second airflow generator provided on a wheel house of a rear wheel or on the rear wheel.

5. The airflow adjusting apparatus according to claim 1, further comprising
   a turning state detector configured to detect a turning state of a vehicle, wherein
   the airflow generator comprises two or more airflow generators, and
   the controller is configured to cause, when the vehicle is turning, a direction in which the airflow generator provided on a turning inner wheel side generates an airflow to be reversed and thereby generate an airflow that flows toward an inner side in the vehicle widthwise direction.

6. The airflow adjusting apparatus according to claim 1, wherein the airflow generator comprises a second airflow generator, the second airflow generator being provided on a surface portion, of the inner surface of the wheel house, on a lateral side of the wheel, the second airflow generator being configured to generate an airflow along the surface portion on the lateral side of the wheel.

7. The airflow adjusting apparatus according to claim 6, wherein the second airflow generator is provided on a portion, of the surface portion on the lateral side of the wheel, that opposes an upper half of the wheel, the second airflow generator being configured to generate an airflow that flows toward the front side of the wheel in a vehicle front-rear direction.

8. The airflow adjusting apparatus according to claim 1, wherein the airflow generator comprises a third airflow generator, the third airflow generator being provided on the inner surface of the wheel house, the third airflow generator being configured to generate an airflow that flows toward an inner diameter side of a rim of the wheel along a surface portion, of the inner surface, on lateral side of the wheel.

9. The airflow adjusting apparatus according to claim 8, further comprising a heat generation amount estimator configured to estimate a heat generation amount of a device disposed on the inner diameter side of the rim, wherein the controller is configured to activate the third airflow generator in a case where the heat generation amount of the device estimated by the heat generation amount estimator is equal to or greater than a predetermined amount.

10. The airflow adjusting apparatus according to claim 1, wherein the airflow generator comprises a fourth airflow generator, the fourth airflow generator being provided on a rim of the wheel, the fourth airflow generator being configured to generate an airflow that flows toward the outer side in the vehicle widthwise direction along a surface of the rim.

11. The airflow adjusting apparatus according to claim 10, further comprising a heat generation amount estimator configured to estimate a heat generation amount of a device disposed on an inner diameter side of the rim, wherein the controller is configured to activate the fourth airflow generator in a case where the heat generation amount of the device estimated by the heat generation amount estimator is equal to or greater than a predetermined amount.

12. The airflow adjusting apparatus according to claim 1, wherein the airflow generator includes a plasma actuator, the plasma actuator including a pair of electrodes and a power supply, the pair of electrodes being disposed with a dielectric interposed in between, the power supply being configured to apply an alternating-current voltage to the pair of electrodes.

13. The airflow adjusting apparatus according to claim 1, further comprising two or more plasma actuators that are disposed, on a tire side surface of the wheel, side by side in a circumferential direction of the wheel, wherein the controller is configured to further control the plasma actuators, the controller being configured to cause, when a vehicle is traveling straight, one of the plasma actuators, present at a predetermined position in the circumferential direction to generate an airflow that flows toward a rear side of the wheel along the tire side surface.

* * * * *